US012758873B2

(12) United States Patent
Zhang et al.

(10) Patent No.: US 12,758,873 B2
(45) Date of Patent: Oct. 13, 2026

(54) METHODS FOR PROCESSING GAME DATA, AND COMPUTER DEVICES AND STORAGE MEDIA THEREOF

(71) Applicant: NETEASE (HANGZHOU) NETWORK CO., LTD., Hangzhou (CN)

(72) Inventors: Yingpeng Zhang, Hangzhou (CN); Yuzhi Wang, Hangzhou (CN)

(73) Assignee: EVE POWER CO., LTD., Jingmen (CN)

( * ) Notice: Subject to any disclaimer, the term of this patent is extended or adjusted under 35 U.S.C. 154(b) by 310 days.

(21) Appl. No.: 18/579,857

(22) PCT Filed: Jun. 20, 2022

(86) PCT No.: PCT/CN2022/099806
§ 371 (c)(1),
(2) Date: Jan. 16, 2024

(87) PCT Pub. No.: WO2023/155348
PCT Pub. Date: Aug. 24, 2023

(65) Prior Publication Data

US 2024/0350910 A1 Oct. 24, 2024

(30) Foreign Application Priority Data

Feb. 16, 2022 (CN) ......................... 202210141625.4

(51) Int. Cl.
*A63F 13/352* (2014.01)
*A63F 13/52* (2014.01)

(52) U.S. Cl.
CPC .................................... *A63F 13/52* (2014.09)

(58) Field of Classification Search
None
See application file for complete search history.

(56) References Cited

U.S. PATENT DOCUMENTS 8,019,797 B2 * 9/2011 Hamilton, II ........... G06F 16/40 707/769
8,797,354 B2 * 8/2014 Noge .................... A63F 13/213 382/164

(Continued)

FOREIGN PATENT DOCUMENTS

CN 108257103 A 7/2018
CN 113952720 A 1/2022
CN 114522420 A 5/2022

OTHER PUBLICATIONS

International Search Report in International application No. PCT/CN2022/099806, mailed on Sep. 15, 2022.

(Continued)

*Primary Examiner* — Sunit Pandya
(74) *Attorney, Agent, or Firm* — PV IP PC; Wei Te Chung

(57) ABSTRACT

A method for processing game data includes: obtaining a target visibility set corresponding to a target sub-region of a plurality of sub-regions, wherein a specified virtual scene is divided into the sub-regions and includes one or more objects, and the target visibility set includes visibility of at least one object of the objects in the target sub-region; determining, from the plurality of sub-regions, one or more of sub-regions adjacent to the target sub-region as one or more adjacent sub-regions; obtaining a visibility set corresponding to an adjacent sub-region of the one or more adjacent sub-regions; and determining a difference value between the target visibility set and the visibility set, and in response to determining that the difference value satisfies a preset condition, merging the target visibility set and the visibility set to obtain a merged visibility set as a visibility set common to the target sub-region and the adjacent sub-region.

18 Claims, 13 Drawing Sheets

(56) References Cited

U.S. PATENT DOCUMENTS

| | | | | |
|---|---|---|---|---|
| 11,120,606 | B1 * | 9/2021 | Lamarre | G06T 15/04 |
| 11,798,223 | B2 | 10/2023 | Li et al. | |
| 2020/0197797 | A1 * | 6/2020 | Yong | A63F 13/795 |

OTHER PUBLICATIONS

Written Opinion of the International Search Authority in International application No. PCT/CN2022/099806, mailed on Sep. 15, 2022.

* cited by examiner

Rendering the one or more objects in the specified virtual scene based on the merged visibility set

FIG. 21

METHODS FOR PROCESSING GAME DATA, AND COMPUTER DEVICES AND STORAGE MEDIA THEREOF

CROSS-REFERENCE TO RELATED APPLICATION

This application is a US national phase Application of International Application No. PCT/CN2022/099806, filed on Jun. 20, 2022, which claims priority to Chinese Patent Application No. 202210141625.4, filed on Feb. 16, 2022. The disclosures of the above applications are incorporated herein by reference in their entireties for all purposes.

TECHNICAL FIELD

The present disclosure relates to computer technologies, and more particularly, to methods and apparatuses for processing game data, computer devices, and storage media.

BACKGROUND

Occlusion culling refers to techniques of not rendering an object when it is occluded by other objects and is out of a visible range of a camera. The occlusion culling works by using a virtual camera in a scene to create a hierarchy of potential visibility states for an object. These data allow each camera to distinguish whether objects are visible in real time, and only visible objects are rendered, thereby reducing the number of drawcalls and improving the running efficiency of a game.

In related technologies, when a scene is to be rendered, the scene is first divided into several smaller cubic regions, and then a visibility set of each of the regions is calculated, based on which one or more invisible objects will not be rendered. When the number of the regions is large, the number of the visibility sets will also be large, which may increase resource consumption. Therefore, a brute-force clustering algorithm is designed, in which the following operations are iteratively performed: for all visibility sets, a difference between every two ones thereof is calculated, and then two ones thereof with the smallest difference are selected for merging.

SUMMARY

In a first aspect, the present disclosure provides a method for processing game data, including:

obtaining a target visibility set corresponding to a target sub-region of a plurality of sub-regions, wherein a specified virtual scene is divided into the plurality of sub-regions, the specified virtual scene comprises one or more objects, and the target visibility set includes visibility of at least one object of the one or more objects in the target sub-region;

determining, from the plurality of sub-regions, one or more of sub-regions adjacent to the target sub-region as one or more adjacent sub-regions;

obtaining a visibility set corresponding to an adjacent sub-region of the one or more adjacent sub-regions, the visibility set including visibility of at least one object of the one or more objects in the adjacent sub-region; and determining a difference value between the target visibility set and the visibility set, and in response to determining that the difference value satisfies a preset condition, merging the target visibility set and the visibility set to obtain a merged visibility set as a visibility set common to the target sub-region and the adjacent sub-region.

In a second aspect, the present disclosure provides a computer device, including: a processor and a memory storing a computer program executable by the processor to perform a method for processing game data provided by any one of the embodiments of the present disclosure. The method includes: obtaining a target visibility set corresponding to a target sub-region of a plurality of sub-regions, wherein a specified virtual scene is divided into the plurality of sub-regions, the specified virtual scene comprises one or more objects, and the target visibility set includes visibility of at least one object of the one or more objects in the target sub-region; determining, from the plurality of sub-regions, one or more of sub-regions adjacent to the target sub-region as one or more adjacent sub-regions; obtaining a visibility set corresponding to an adjacent sub-region of the one or more adjacent sub-regions, the visibility set including visibility of at least one object of the one or more objects in the adjacent sub-region; and determining a difference value between the target visibility set and the visibility set, and in response to determining that the difference value satisfies a preset condition, merging the target visibility set and the visibility set to obtain a merged visibility set as a visibility set common to the target sub-region and the adjacent sub-region.

In a third aspect, the present disclosure provides a storage medium storing a plurality of instructions executable by a processor to perform the method for processing game data as described above. The method includes: obtaining a target visibility set corresponding to a target sub-region of a plurality of sub-regions, wherein a specified virtual scene is divided into the plurality of sub-regions, the specified virtual scene comprises one or more objects, and the target visibility set includes visibility of at least one object of the one or more objects in the target sub-region; determining, from the plurality of sub-regions, one or more of sub-regions adjacent to the target sub-region as one or more adjacent sub-regions; obtaining a visibility set corresponding to an adjacent sub-region of the one or more adjacent sub-regions, the visibility set including visibility of at least one object of the one or more objects in the adjacent sub-region; and determining a difference value between the target visibility set and the visibility set, and in response to determining that the difference value satisfies a preset condition, merging the target visibility set and the visibility set to obtain a merged visibility set as a visibility set common to the target sub-region and the adjacent sub-region.

BRIEF DESCRIPTION OF THE DRAWINGS

Figure 21:
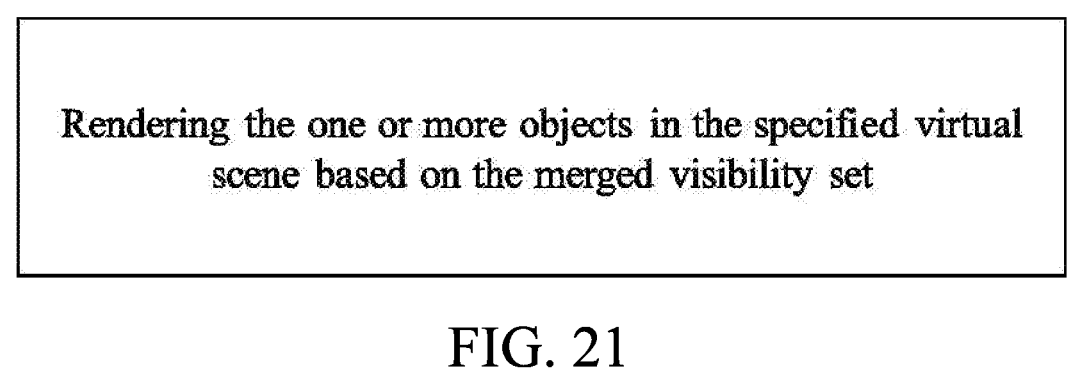

FIG. 21 is a schematic flowchart of a rendering operation according to one or more embodiments of the present disclosure.

DETAILED DESCRIPTION

Figure 1:
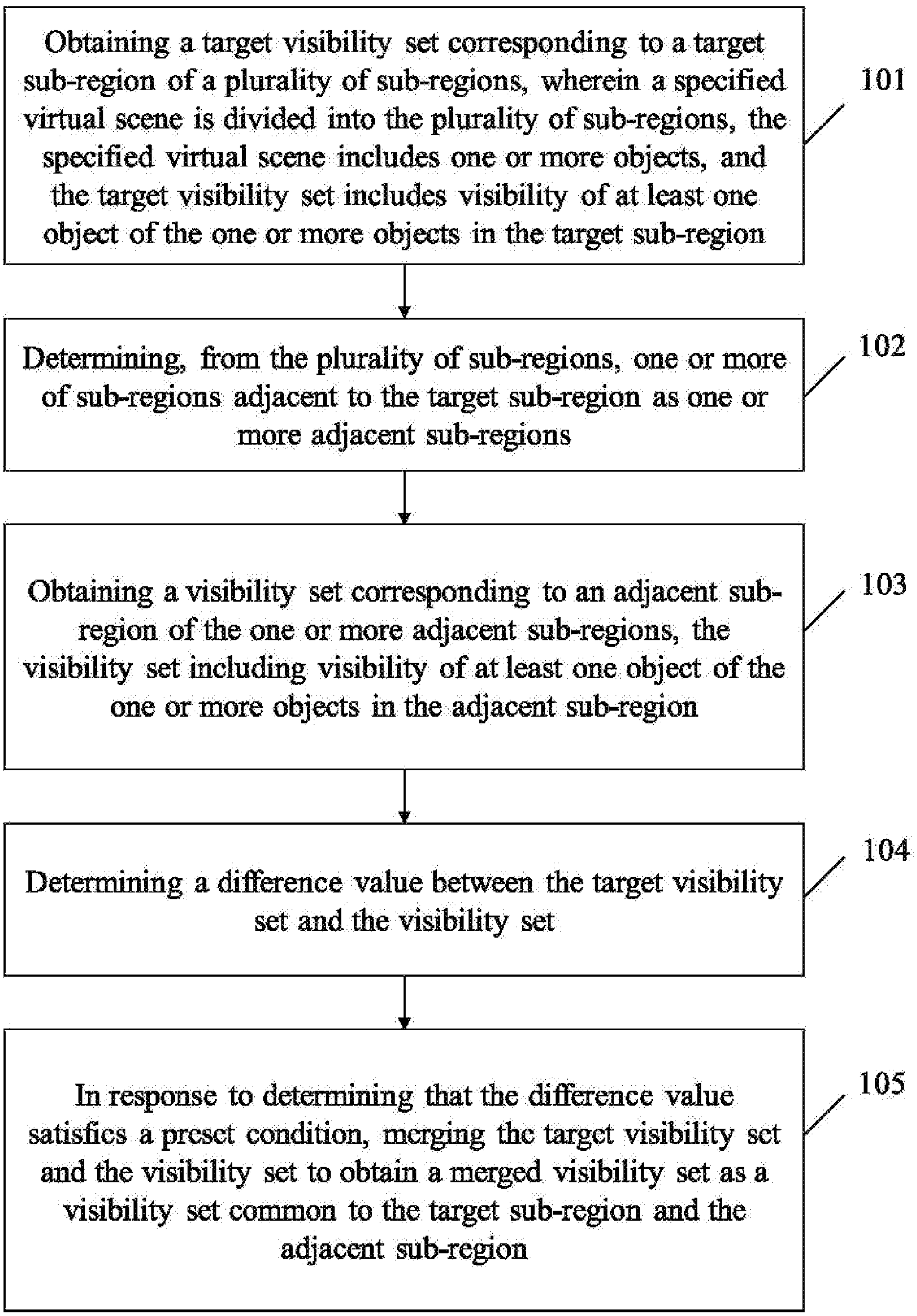
FIG. 1 is a schematic flowchart of a method for processing game data according to one or more embodiments of the present disclosure.

Some embodiments of the present disclosure will be described in detail below in connection with the accompanying drawings. The embodiments are described for illustrative purposes only and are not intended to limit the present disclosure.

One or more embodiments of the present disclosure provide methods and apparatuses for processing game data, storage media, and computer devices. In some embodiments, the methods for processing game data in the embodiments of the present disclosure may be executed by a computer device. The computer device may be a terminal, a server, or the like. The terminal may be a terminal device such as a smart phone, a tablet computer, a notebook computer, a touch screen, a Personal Computer (PC), a Personal Digital Assistant (PDA), or the like. The server can be an independent physical server, or a server cluster or a distributed system composed of multiple physical servers, or may provide cloud services, cloud databases, cloud computing, cloud functions, cloud storage, network services, cloud communication, middleware server, domain name services, security services, Content Distribution Network (CDN), and cloud servers (big data and artificial intelligence platforms) for basic cloud computing services.

For example, the computer device may be a server, and the server may obtain a target visibility set corresponding to a target sub-region of a plurality of sub-regions, wherein a specified virtual scene is divided into the plurality of sub-regions, the specified virtual scene comprises one or more objects, and the target visibility set includes visibility of at least one object of the one or more objects in the target sub-region; determine, from the plurality of sub-regions, one or more of sub-regions adjacent to the target sub-region as one or more adjacent sub-regions; obtain a visibility set corresponding to an adjacent sub-region of the one or more adjacent sub-regions, the visibility set including visibility of at least one object of the one or more objects in the adjacent sub-region; determine a difference value between the target visibility set and the visibility set; and in response to determining that the difference value satisfies a preset condition, merge the target visibility set and the visibility set to obtain a merged visibility set as a visibility set common to the target sub-region and the adjacent sub-region.

The present disclosure provides a method and apparatus for processing game data, a computer device, and a storage medium, which may improve an efficiency for processing visibility sets in the virtual scene.

Each of the these will be described in detail below. It should be noted that a description order of the following embodiments is not intended to limit a preferred order of the embodiments.

One or more embodiments of the present disclosure provide a method for processing game data, which may be performed by a terminal or a server. The embodiments of the present disclosure take the method for processing game data executed by the server as an example for illustration.

Please refer to FIG. 1, FIG. 1 a schematic flowchart of a method for processing game data according to one or more embodiments of the present disclosure. A specific flow of the method for processing game data may be as follows.

In operation 101, a target visibility set corresponding to a target sub-region of a plurality of sub-regions is obtained. A specified virtual scene is divided into the plurality of sub-regions.

In one or more embodiments of the present disclosure, the specified virtual scene refers to a model of a real scene constructed by a software program according to a certain proportion, which may be displayed by a display device. The specified virtual scene may be a three-dimensional scene.

When the specified virtual scene is displayed by the display device, one or more objects in the virtual scene need to be rendered. Rendering in computer graphics refers to a process of using software to generate an image from a model. The model is a description of a three-dimensional object using a strictly defined language or data structure, and includes geometry, viewpoint, texture, and lighting information. The model in a three-dimensional (3D) scene is converted into a digital image through a two-dimensional (2D) projection according to configured environment, lighting, materials and rendering parameters.

In some embodiments, when the one or more objects in the specified virtual scene are rendered, some objects are selected from all objects in the specified virtual scene for rendering according to a position of a captured image of the specified virtual scene. One or more hidden objects (i.e., not displayed in the captured image) do not need to be rendered to save processing resources.

Since there may be many objects in the specified virtual scene, to facilitate calculation of objects to be rendered, the specified virtual scene can be divided into the plurality of sub-regions. The specified virtual scene may be a 3D scene, and the plurality of sub-regions may be cubic regions of a same shape that do not intersect each other.

For example, a 3D coordinate system (including x axis, y axis, and z axis directions) for the specified virtual scene may be constructed. Each of the sub-regions may be represented using two coordinates ($x_{min}$, $y_{min}$, $z_{min}$) and ($x_{max}$, $y_{max}$, $z_{max}$), which indicate that the each sub-region includes and only includes coordinate points (x, y, z) satisfying the following expression: $x_{min} \le x < x_{max}$ and $y_{min} \le y < y_{max}$ and $z_{min} \le y < z_{max}$. The sub-regions do not intersect each other, that is, any point in the specified virtual scene either does not belong to any sub-region of the specified virtual scene, or belongs to only one sub-region of the specified virtual scene.

Each object in the specified virtual scene has corresponding visibility in each of the sub-regions, which refers to a degree of visibility of the each object when observed at a position of the each of the sub-region. When an observation position and an observation direction change within a region, the object(s) that may be observed will also change. Through a certain estimation method, the observed visibility (referred to as visibility for short) of each object may be estimated. A value range of the visibility can be expressed as real numbers [0.0, 1.0]. The smaller the visibility of an object is, the less likely the object is to be observed, and vice versa, the easier the object is to be observed.

For example, the specified virtual scene may include: an object A, an object B, and an object C. The specified virtual scene may be divided into: a first sub-region, a second sub-region, and a third sub-region. Visibility of the object A in the first sub-region is determined as 0.1, visibility of the object A in the second sub-region is determined as 0.5, and visibility of the object A in the third sub-region is determined as 0.3. Visibility of the object B in the first sub-region is determined as 0.24, visibility of the object B in the second sub-region is determined as 0.7, and visibility of the object B in the third sub-region is determined as 0.3. Visibility of the object C in the first sub-region is determined as 0.8, visibility of the object C in the second sub-region is determined as 0.65, and visibility of the object C in the third sub-region is determined as 0.31.

The specified virtual scene includes one or more object, and the target visibility set includes the visibility of at least one object of the one or more objects in the target sub-region. That is to say, observation degrees of all objects in the virtual scene are arranged into a one-dimensional (1D) list, which is referred to as a visibility set.

For example, the target sub-region may be the first sub-region. In the first sub-region, the visibility of the object A may be 0.1, the visibility of the object B may be 0.24, and the visibility of the object C may be 0.8. Further, based on the visibility of the objects A, B, and C in the first sub-region, the target visibility set is determined as: [0.1, 0.24, 0.8].

When the observation position is in the target sub-region, a constant may be specified. One or more objects whose visibility is less than the constant is considered invisible in the target sub-region, that is, the one or more objects will not be drawn during a rendering process. Otherwise, one or more objects are considered visible in the target sub-region and will be drawn. This reduces rendering overhead.

For example, for the above embodiment, if the constant is 0.25, the object A and the object B are invisible in the target sub-region, since the visibility of the object A and the object B is less than 0.25, and the object C is visible in the target sub-region, since the visibility of the object C is greater than 0.25. Due to a reduction of contents to be drawn, an efficiency for drawing a scene image may be improved.

In operation 102, one or more sub-regions adjacent to the target sub-region are determined from the plurality of sub-regions as one or more adjacent sub-regions.

The adjacent sub-regions refer to sub-regions closer to the target sub-region in the specified virtual scene.

In some embodiments, to select the one or more of the sub-regions adjacent to the target sub-region, the operation of determining the one or more sub-regions adjacent to the target sub-region as the one or more adjacent sub-regions may include the following operations:

obtaining first position information of the target sub-region in the specified virtual scene and second position information of one or more other sub-regions than the target sub-region in the specified virtual scene; and determining, from the one or more other sub-regions, a sub-region adjacent to the target sub-region based on the first position information and the second position information, as the one or more adjacent sub-regions.

The first position information refers to a position of the target sub-region in a coordinate system of the specified virtual scene, and the second position information refers to positions of other sub-regions in the specified virtual scene except the target sub-region in the coordinate system of the specified virtual scene.

Further, one or more of the other sub-regions adjacent to the target sub-region may be selected based on the positions of the target sub-region and the other sub-regions in the coordinate system of the specified virtual scene, so as to obtain the one or more adjacent sub-regions.

In some embodiments, a specified coordinate system is constructed based on the specified virtual scene. The first position information includes a first coordinate set of the target sub-region in the specified coordinate system, and the second position information includes respective second coordinate sets of the one or more other sub-regions in the specified coordinate system. To quickly determine the at least one adjacent sub-region, the operation of determining the sub-region adjacent to the target sub-region from the one or more other sub-regions based on the first position information and the second position information as the one or more adjacent sub-regions may include the following operations:

determining, based on positional relationship between the first coordinate set and each of the second coordinate sets in the specified coordinate system, a second coordinate set of the second coordinate sets adjacent to the first coordinate set; and determining, from the one or more other sub-regions, the sub-region corresponding to the second coordinate set of the second coordinate sets, as the one or more adjacent sub-regions.

In some embodiments, as mentioned in the above operations, each of the sub-regions in the specified coordinate system may be represented by two coordinates ($x_{min}$, $y_{min}$, $z_{min}$) and ($x_{max}$, $y_{max}$, $z_{max}$), that is, a coordinate range from a minimum coordinate to a maximum coordinate. Since the sub-regions are three-dimensional regions in the specified coordinate system, the sub-regions adjacent to each other share a region edge. Thus, one or more coordinate points within a coordinate range of the target sub-region may be determined from the second coordinate sets of the other sub-regions, and one or more of the other sub-regions including the one or more coordinate points may be determined as the one or more adjacent sub-regions of the target sub-region.

In operation 103, a visibility set corresponding to an adjacent sub-region of the one or more adjacent sub-regions is obtained.

The visibility set including visibility of at least one object of the one or more objects in the adjacent sub-region.

For example, the adjacent sub-region may be the second sub-region. In the second sub-region, the visibility of the object A may be 0.5, the visibility of the object B may be 0.7, and the visibility of the object C may be 0.65. Further, based on the visibility of the objects A, B, and C in the second sub-region, the visibility set is determined as: [0.5, 0.7, 0.65].

In operation 104, a difference value between the target visibility set and the visibility set is determined.

A difference value between the target visibility set and a visibility set is used to measure whether the target visibility set and the visibility set can be merged. The smaller the difference value is, the smaller a difference between the visibility of the object in the target visibility set and the visibility set is, and the target visibility set may be merged with the visibility set. On the contrary, the greater the difference value is, the greater the difference between the visibility of the object in the target visibility set and the visibility set is, and the target visibility set and the visibility set cannot be merged.

In some embodiments, to determine an accuracy of the difference values, the operation of determining the difference value between the target visibility set and the visibility set may include the following operations:

- for each of the one or more objects in the specified virtual scene, obtaining first visibility corresponding to the each of the at least one object in the target visibility set and second visibility corresponding to the each of the at least one object in each of the visibility sets, and
- obtaining a comparison result by comparing each of the first visibility and the second visibility with specified visibility; and
- determining the difference value based on the comparison result.

For example, as mentioned in the above example, the specified virtual scene may include: the object A, the object B, and the object C. The specified virtual scene may be divided into: the first sub-region, the second sub-region, and the third sub-region. The target sub-region may be the first sub-region, and the target visibility set includes the first visibility of the object A, the first visibility of the object B, and the first visibility of the object C, which may be: [0.1, 0.24, 0.8]. The visibility sets include the second visibility of the object A, the second visibility of the object B, and the second visibility of the object C, which may be: [0.5, 0.7, 0.65].

The specified visibility is visibility standard used to determine whether to render the object. If the visibility of the object is greater than or equal to the specified visibility, the object may be rendered; if the visibility of the object is less than the specified visibility, there is no need to render the object. For example, the specified visibility may be 0.5.

Further, the visibility of each object in different visibility sets is compared with the specified visibility to obtain the comparison result, and then the difference value between the target visibility set and each of the visibility sets is determined based on the comparison result.

In some embodiments, to improve an accuracy of visibility sets merging, the operation of determining the difference value based on the comparison result may include the following operations:

- for the each object, in response to determining that the comparison result for the object indicates that the first visibility is greater than the specified visibility and the second visibility is less than the specified visibility or indicates that the first visibility is less than the specified visibility and the second visibility is greater than the specified visibility, determining the object as a target object, to obtain one or more target objects; and counting a number of the one or more target objects as the difference value.

By comparing the first visibility and the second visibility of each object with the specified visibility, the obtained comparison results include: for the object A, the first visibility is less than the specified visibility and the second visibility is equal to the specified visibility; for the object B, the first visibility is less than the specified visibility and the second visibility is greater than the specified visibility; for the object C, the first visibility is greater than the specified visibility and the second visibility is greater than the specified visibility.

Further, combining the comparison results, the number of objects with the first visibility greater than the specified visibility and the second visibility less than the specified visibility, or the number (which may be 2, that is, the difference value may be 2) of objects with the first visibility less than the specified visibility and the second visibility greater than the specified visibility may be obtained.

In operation 105, in response to determining that the difference value satisfies a preset condition, the target visibility set and the each of the one or more visibility sets are merged to obtain a merged visibility set as a visibility set common to the target sub-region and one of the at least one adjacent sub-region corresponding to the each of the one or more visibility sets.

The preset condition is not greater than a preset difference value.

In some embodiments, to improve a merging efficiency of visibility sets, the operation of merging the target visibility set and the each of the one or more visibility sets to obtain the merged visibility set in response to determining that the difference value satisfies the preset condition may include the following operations:

- in response to determining that the difference value is not greater than the preset difference value, determining the visibility set as a target visibility set for merging; and
- merging the target visibility set and the target visibility set for merging to obtain the merged visibility set.

In one or more embodiments of the present disclosure, in the specified virtual scene, there may be a plurality of adjacent regions adjacent to the target sub-region. For example, the specified virtual scene may be divided into: the first sub-region, the second sub-region, and the third sub-region, a fourth sub-region, a fifth sub-region, a sixth sub-region, etc., where the target sub-region may be the first sub-region, and the adjacent sub-regions adjacent to the first sub-region may include the third sub-region, the fourth sub-region, fifth sub-region.

A visibility set corresponding to the first sub-region may be a first visibility set, that is, the target visibility set. A visibility set corresponding to the third sub-region may be a third visibility set. A visibility set corresponding to the fourth sub-region may be a fourth visibility set. A visibility set corresponding to the fifth sub-region may be a fifth visibility set.

Further, the difference value between the target sub-region and the visibility set of each of the adjacent sub-regions is determined. The difference value between the target visibility set and the third visibility set may be 2. The difference value between the target visibility set and the fourth visibility set may be 1. The difference value between the target visibility set and the fifth visibility set may be 1.

For example, the preset difference value may be 1, and thus the difference value that satisfies the preset condition means that the difference value is not greater than the preset difference value 1. Since the difference value between the target visibility set and the fourth visibility set is 1, and the difference value between the target visibility set and the fifth visibility set is 1, the target visibility sets for merging include the fourth visibility set and the fifth visibility set. Then, the target visibility set and the target visibility sets for merging are merged to obtain the merged visibility set.

In some embodiments, to improve a merging effect of visibility sets, the operation of merging the target visibility set and the target visibility set for merging to obtain the merged visibility set may include the following operations:

- for each object of the one or more objects, determining a greater one of first visibility of the target visibility set corresponding to the object and second visibility of the target visibility set corresponding to the object, as an updated visibility corresponding to the object, to obtain updated visibilities respectively corresponding to the one or more objects; and
- constructing an updated visibility set based on the updated visibilities to obtain the merged visibility set.

For example, the target visibility set includes the first visibility of each object, which may be: [0.2, 0.75, 0.8], and the target visibility set for merging includes the second visibility of each object, which may be: [0.5, 0.64, 0.76]. The first visibility and the second visibility of the object A are respectively 0.2 and 0.5, and thus the maxi greater mum visibility corresponding to the object A may be 0.5. The first visibility and the second visibility of the object B are respectively 0.74 and 0.64, and thus the greater visibility corresponding to the object B may be 0.74. The first visibility and the second visibility of the object C are respectively 0.8 and 0.76, and thus the greater visibility corresponding to the object C may be 0.8. The updated visibility set may be created based on the maximum visibility corresponding to each of the objects, to obtain the merged visibility set [0.5, 0.74, 0.8].

In some embodiments, when there are a plurality of target visibility sets for merging that need to be merged with the target visibility set, to improve the merging efficiency of visibility sets, the method further includes the following operations:

- determining difference values between the target visibility set and a plurality of visibility sets respectively corresponding to the plurality of adjacent sub-regions;
- in response to determining that the difference values are not greater than the preset difference value, determining the plurality of visibility sets as a plurality of target visibility sets for merging;
- sorting the plurality of target visibility sets for merging based on magnitudes of the difference values, to obtain a sequence of the plurality of target visibility sets for merging; and
- merging the target visibility set with the plurality of target visibility sets for merging one by one based on the sequence to obtain the merged visibility set.

In one or more embodiments of the present disclosure, a priority queue may be used to arrange the plurality of target visibility sets for merging. In the priority queue, elements are given priorities. When the elements are accessed, an element with a highest priority is removed first. The priority queue has a behaviour characteristic of first in, largest out. The priority queue is generally implemented using a heap data structure.

In some embodiments, the priority queue is a collection of 0 or more elements, and each element has a priority or value. Operations performed on the priority queue include: 1) searching; 2) inserting a new element; 3) deleting. In a minpriority queue, the searching operation is used to search for an element with a lowest priority, and the deleting operation is used to delete the element. In the maxpriority queue, the searching operation is used to search for an element with a highest priority, and the deleting operation is used to delete the element. The elements in the priority queue may have a same priority, and the searching and deleting operations may be performed according to any priority.

In some embodiments, the plurality of target visibility sets for merging are sorted according to the difference value between the target visibility set and each of the plurality of target visibility sets for merging. The plurality of target visibility sets for merging may be sorted according to an order of the difference values of the plurality of target visibility sets for merging from small to large, and then a target visibility set for merging having a smaller difference value from the target visibility set.

Further, the plurality of sorted target visibility sets for merging may be inserted into the priority queue to obtain the sorted sequence. In the priority queue, a priority corresponding to the target visibility set for merging having a smaller difference value from the target visibility set is set to be higher, that is, is prioritized for merging. Then, the target visibility sets for merging in the priority queue are merged with the target visibility set in order of priorities until the target visibility set has been merged with the plurality of target visibility sets for merging to obtain the merged visibility set.

For example, the target visibility sets for merging may include: the third visibility set, the fourth visibility set, and the fifth visibility set. Further, according to the difference values between the target visibility sets for merging and the target visibility sets, the target visibility sets for merging are sorted from small to large. The sequence may be: the third visibility set, the fourth visibility set, and the fifth visibility set.

Then, the target visibility set is merged with the target visibility sets for merging in sequence according to the sequence, including: first, merging the target visibility set with the third visibility set to generate a first merged visibility set, then merging the first merged visibility set with the fourth visibility set to generate a second merged visibility set, and then merging the second merged visibility set with the fifth visibility set to generate the merged visibility set. In this way, the merging of the target visibility set and the plurality of target visibility sets to for merging is completed.

In some embodiments, to avoid repeated merging operations on the visibility sets, before the operation of merging the target visibility set and the visibility set to obtain the merged visibility set in response to determining that the difference value satisfies the preset condition, the method further includes the following operations:

- obtaining historical merging information of the target visibility set;
- in response to determining that the historical merging information indicates that the target visibility set has not been merged, merging the target visibility set and the visibility set.

The historical merging information includes visibility set merging information corresponding to the target visibility set before a current moment. For example, the historical merging information may include that the target visibility set has been merged before the current moment, indicating that the target visibility set is a merged visibility set; or, the historical merging information does not include that the target visibility set has been merged, indicating that the target visibility set is the unmerged visibility set.

Further, to avoid repeated merging operations on the target visibility set, when the historical merging information of the target visibility set indicates that the target visibility set is the unmerged visibility set, the target visibility set and one or more of the visibility sets may be merged in response to one or more difference values between the target visibility set and the one or more of the visibility sets satisfying the preset condition.

In another case, if the historical merging information of the target visibility set indicates that the target visibility set is the merged visibility set, there is no need to perform the merging on the target visibility set, and subsequent operations may be performed directly on the target visibility set, which may improve a usage efficiency of visibility sets.

In some embodiments, after completing the merging of the target visibility set, one or more corresponding operations may be performed based on the obtained merged visibility set, and the method may further include the following operations:

- rendering the one or more objects in the specified virtual scene based on the merged visibility set.

In one or more embodiments of the present disclosure, the obtained merged visibility set may be used as the visibility set common to the target sub-region and the adjacent sub-region(s) that is/are merged with the visibility set of the target sub-region, that is, multiple sub-regions share one visibility set, reducing a requirement for storage space.

Further, when the one or more objects in the specified virtual scene are rendered at the observation position of the target sub-region, one or more objects for rendering may be determined based on the visibility corresponding to each of the one or more objects in the merged visibility set, and then the one or more objects for rendering may be rendered.

In one or more embodiments of the present disclosure, for a specified virtual scene including n objects and m sub-regions, a total of n×m real numbers are needed to represent visibility sets of these sub-regions, and the amount of data is relatively large. Thus, the visibility sets are under consideration for classification.

For example, there are originally 10 sub-regions, and each sub-region corresponds to 1 visibility set, so there are 10 visibility sets in total. Through the merging of the visibility sets in this solution, 10 visibility sets can be classified into 5 categories. Visibility sets in each category may be merged into a new visibility set. Each category corresponds to 1 (new) visibility set, and only one copy of data needs to be stored in each visibility set. In this way, the requirement for storage space may be reduced.

In some embodiments, to avoid missing some visibility sets, a difference value of each of which from the target visibility set satisfies a merging condition, before merging the target visibility set and the visibility set to obtain the merged visibility set in response to determining that the difference value satisfies the preset condition, the method may further include the following operations:

- obtaining an other visibility set, wherein a first difference value between the other visibility set and the visibility set satisfies the present condition; and
- calculating a second difference value between the target visibility set and the other visibility set.

Then, the operation of merging the target visibility set and the visibility set to obtain the merged visibility set in response to determining that the difference value satisfies the preset condition may include the following operations:

- in response to determining that the difference value satisfies the preset condition, merging the target visibility set and the visibility set, and in response to determining that the second difference value satisfies the preset condition, merging the target visibility set and the other visibility set, to obtain the merged visibility set.

The first difference value refers to a difference value between each of the visibility sets and the other visibility sets.

The other visibility sets refer to visibility sets, first difference values of which from one of the visibility sets are not greater than the preset difference value.

Further, difference values between the target visibility set and the other visibility sets are determined to obtain the second difference values, and then the target visibility set and the one or more of the other visibility sets corresponding to the second difference value satisfying the preset condition are merged.

For example, the target visibility set may be v, the visibility set may be u, and the other visibility set may be i, that is, $M_{i,u} \neq inf$, $M_{i,v} = inf$, if a sum $M_{i,v} + M_{u,v}$ is relatively small (that is, less than a set value), a true value of $M_{i,v}$ may be additionally added, to find other visibility sets that match the target visibility set for merging. $M_{x,y}$ represents a maximum difference value between a visibility set in a same division unit as a visibility set x and a visibility set in a same division unit as a visibility set y.

In one or more embodiments of the present disclosure, by additionally calculating the difference values between the target visibility set and the other visibility sets that may satisfy the merging condition, a more comprehensive visibility set to be merged with the target visibility set is obtained, which further ensures an accuracy of a merging result of the visibility sets.

The embodiments of the present disclosure discloses a method for processing game data, including: obtaining a target visibility set corresponding to a target sub-region of a plurality of sub-regions, wherein a specified virtual scene is divided into the plurality of sub-regions, the specified virtual scene comprises one or more objects, and the target visibility set comprises visibility of at least one object of the one or more objects in the target sub-region; determining, from the plurality of sub-regions, one or more of sub-regions adjacent to the target sub-region as one or more adjacent sub-region; obtaining a visibility set corresponding to an adjacent sub-region of the one or more adjacent sub-region; determining a difference value between the target visibility set and the visibility set; and in response to determining that the difference value satisfies a preset condition, merging the target visibility set and the visibility set to obtain a merged visibility set as a visibility set common to the target sub-region and the adjacent sub-region, so as to improve an efficiency for processing visibility sets in the virtual scene.

Figure 2:
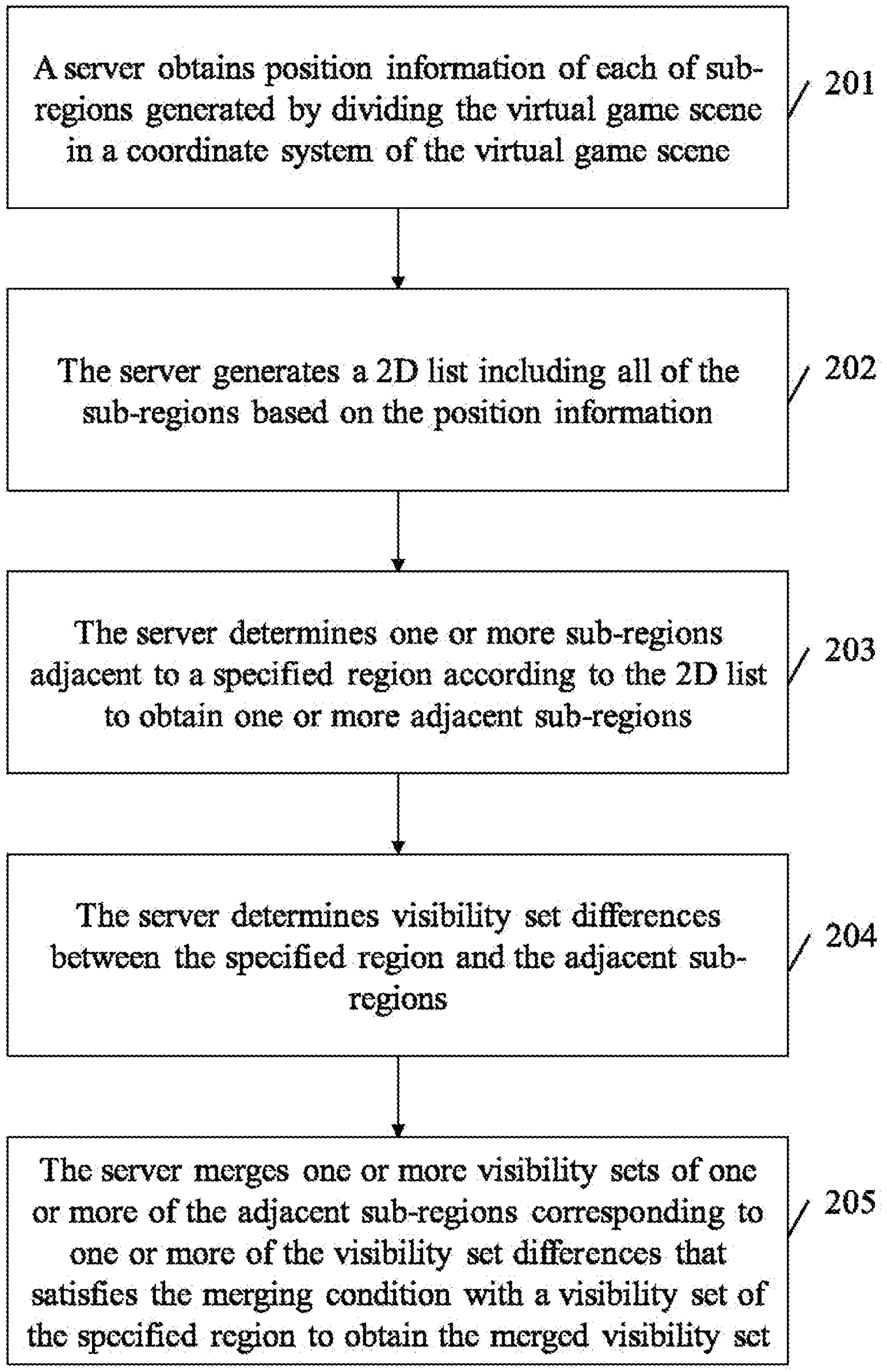
FIG. 2 is a schematic flowchart of another method for processing game data according to one or more embodiments of the present disclosure.

According to the content introduced above, an example will be used below to further illustrate the methods for processing game data of the present disclosure. Please refer to FIG. 2. FIG. 2 is a schematic flowchart of another method for processing game data according to one or more embodiments of the present disclosure. Taking a method for processing game data applied to a virtual game scene as an example, the specific flow may be as follows.

In operation 201, a server obtains position information of each of sub-regions generated by dividing the virtual game scene in a coordinate system of the virtual game scene.

In one or more embodiments of the present disclosure, the virtual game scene may be divided into a plurality of cubic regions of a same shape that do not intersect each other, that is, a plurality of sub-regions are obtained. The virtual game scene may be a three-dimensional scene, and a three-dimensional orthogonal coordinate system may be created based on the virtual game scene.

Figure 3:
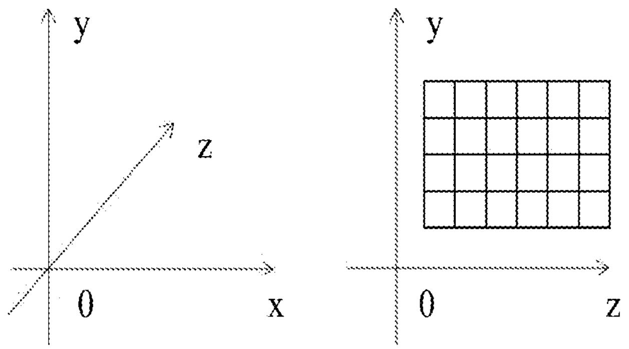
FIG. 3 is a schematic diagram illustrating division of a virtual scene into a plurality of sub-regions according to one or more embodiments of the present disclosure.

For example, please refer to FIG. 3, FIG. 3 is a schematic diagram illustrating division of a virtual scene into a plurality of sub regions according to one or more embodiments of the present disclosure. The three-dimensional orthogonal coordinate system shown in FIG. 3 consists of three coordinate axes x, y, and z. A direction of the y axis is vertically upward. On the xz plane, a rectangular region is divided into several rows and columns of squares in a same size along a direction parallel to the coordinate axes.

In some embodiments, for the three-dimensional orthogonal coordinate system corresponding to the virtual game scene, each sub-region corresponds to a cubic region in the three-dimensional orthogonal coordinate system.

Figure 4:
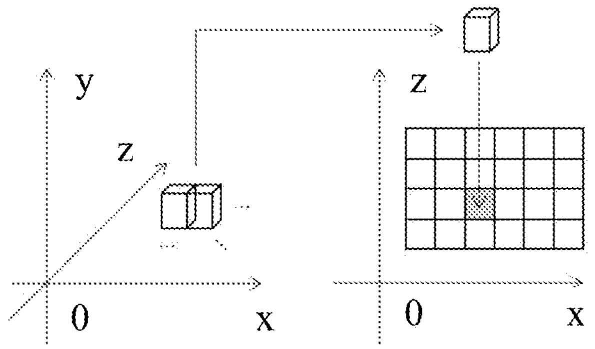
FIG. 4 is a schematic diagram illustrating division of a virtual scene into a plurality of sub-regions according to one or more embodiments of the present disclosure.

For example, please refer to FIG. 4, FIG. 4 is a schematic diagram illustrating division of a virtual scene into a plurality of sub regions according to one or more embodiments of the present disclosure. The three-dimensional orthogonal coordinate system corresponding to the virtual game scene shown in FIG. 4 includes n cubic regions of a same shape that do not intersect each other. A projection of each sub-region on the xz plane is one of the aforementioned rectangular squares. Each sub-region corresponds to a visibility set.

The position information refers to a spatial position of each sub-region in the coordinate system.

In operation 202, the server generates a 2D list including all of the sub-regions based on the position information.

Figure 5:
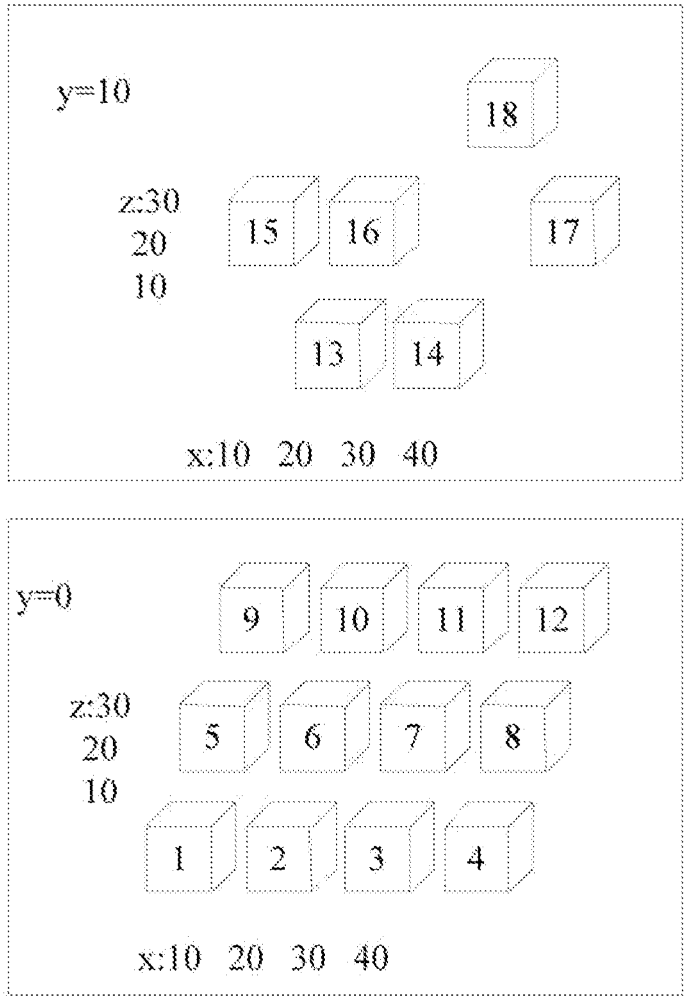
FIG. 5 is a schematic diagram illustrating respective positions of a plurality of sub-regions in a virtual game scene in a coordinate system according to one or more embodiments of the present disclosure.

For example, please refer to FIG. 5, FIG. 5 schematically shows respective positions of the plurality of sub-regions in the virtual game scene in the coordinate system, including two layers in the vertical direction, where a lower layer y=0 and an upper layer y=10. For the lower layer y=0 and the upper layer y=10, x coordinates from left to right are: 10, 20, 30, 40, and z coordinates from back to front are: 10, 20, 30. A visibility set number corresponding to each sub-region is marked in cubes, and the number may also be regarded as a number of each sub-region.

Further, it may be determined that there are 4 essentially different x coordinates and 3 essentially different z coordinates. Therefore, a 4×3 table can be constructed. Then, each sub-region is checked in turn. First, a region numbered 1 has an x coordinate of 10 (which is the $4^{th}$ largest among all x coordinates) and a z coordinate of 10 (which is the $3^{rd}$ largest among all z coordinates). Therefore, the number of the sub-region is filled in a cell (3, 1).

Next, a region numbered 2 has an x coordinate of 20 (which is the $3^{rd}$ largest among all x coordinates) and a z coordinate of 10 (which is the $3^{rd}$ largest among all z coordinates). Therefore, the number of the sub-region is filled in a cell (3, 2). Then, a region numbered 3 has an x coordinate of 30 (which is the $2^{nd}$ largest among all x coordinates) and a z coordinate of 10 (which is the $3^{rd}$ largest among all z coordinates). Therefore, the number of the sub-region is filled in a cell (3, 3).

By analogy, a following table may be finally obtained:

| | | | |
|---|---|---|---|
| 9 | 10 | 11, 18 | 12 |
| 5, 15 | 6, 16 | 7 | 8, 17 |
| 1 | 2, 13 | 3, 14 | 4 |

In operation 203, the server determines one or more sub-regions adjacent to a specified region according to the 2D list to obtain one or more adjacent sub-regions.

Through the above constructed 2D list, one or more adjacent sub-regions around a sub-region may be conveniently searched.

For example, to query which cells are around the sub-region numbered 7, first, a cell (2, 3) may be found according to that x=30 is the second largest and z=20 is the second largest. Then, an element in a cell (2±1, 3±1) are an adjacent sub-region adjacent to the sub-region numbered 7. In practical applications, a larger region may be searched, and a form such as (x±k, y±k) may be used.

In operation 204, the server determines visibility set differences between the specified region and the adjacent sub-regions.

In one or more embodiments of the present disclosure, a visibility set may be abstracted as a node, and a number on the node represents a number of the visibility set.

Figure 6:
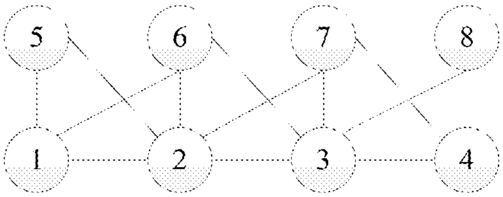
FIG. 6 schematically illustrates a graph of nodes respectively corresponding to a plurality of visibility sets according to one or more embodiments of the present disclosure.

For example, please refer to FIG. 6, FIG. 6 is a schematic diagram of an undirected graph including eight vertices respectively corresponding to eight visibility sets according to one or more embodiments of the present disclosure. In FIG. 6, it is assumed that there are 8 visibility sets, and positions of nodes in the figure represent discretized positions of the visibility sets. It is supposed that a search range is 1.

In some embodiments, for a visibility set 1, its differences from a visibility set 2, a visibility set 5, and a visibility set 6 may be determined, respectively. For the visibility set 2, its differences from the visibility set 1, the visibility set 5, the visibility set 6, a visibility set 3, and a visibility set 7 may be determined, respectively. For the visibility set 3, its differences from the visibility set 2, the visibility set 6, the visibility set 7, a visibility set 4, and a visibility set 8 may be determined, respectively. By analogy, in the end, a distance between each point and a visibility set with a distance (Manhattan) of no more than 1 from the each point is calculated. In this way, a number of times for determining the differences is reduced. For example, differences between the visibility set 1 and any one of the visibility set 3, the visibility set 4, the visibility set 7, and the visibility set 8 are not determined.

In operation 205, the server merges one or more visibility sets of one or more of the adjacent sub-regions corresponding to one or more of the visibility set differences that satisfies the merging condition with a visibility set of the specified region to obtain the merged visibility set.

In one or more embodiments of the present disclosure, an undirected graph including m vertices is constructed, and a number starts from 1. A vertex i corresponds to a visibility set i.

A vertex is an abstraction of a visibility set and an edge is an abstraction of a difference between visibility sets. At present, a value of an edge weight is the difference between the visibility sets.

Then, there may be following situations.

A first type: there is the edge(s), and the edge weight(s) is less than or equal to the preset condition.

A second type: there is the edge(s), and the edge weight(s) is greater than the preset condition.

A third type: there is no edge, which may be regarded as an edge whose edge weight is infinite (recorded as inf, and an appropriate large number such as 100000007 may be selected). A reason for such situation is that the difference value is not actually calculated, rather than being quite large.

Figure 7:
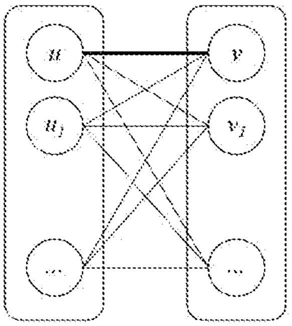
FIG. 7 schematically illustrates an undirected graph with vertices respectively corresponding to a plurality of visibility sets according to one or more embodiments of the present disclosure.

For example, please refer to FIG. 7, FIG. 7 is a schematic diagram of an undirected graph including eight vertices respectively corresponding to eight visibility sets according to one or more embodiments of the present disclosure. In FIG. 7, attributes of edges include two vertices u, v and edge weights w. As an algorithm progresses, the edge weights represent maximum values of differences between visibility sets that are respectively in same division units as u and v. Initially, the graph does not include any edges.

As shown in FIG. 7, a sparse matrix M is used to record the edge weights. When querying the weight of an edge $M_{u,v}$(u, v), if the edge does not exist, infinity inf will be returned; otherwise, a real value denoted as $M_{u,v}$ will be returned.

Since the graph initially has no edges, the matrix is also empty. Since the graph is an undirected graph, $M_{u,v}=M_{v,u}$. A priority queue Q is used to maintain an order of edges. Elements of Q are triplets of a form (u, v, w), which represent the edge whose vertices are u and v and whose weight is w. Each pop-up may be triplets (or one of the triplets) with a smallest w at that time. It should be noted that if the edge weight changes after added in the triplets, the record in the queue will not change accordingly. Therefore, after popping up, w and $M_{u,v}$ need to be compared to determine whether the record is out of date. Initially, since there are no edges, Q is also empty.

During performing the algorithm, it is necessary to inquire vertices that are adjacent to an edge connected with a specified vertex with a weight not exceeding the preset condition (denoted as L), or an edge that once met such condition. Such requirement is suitable for using an adjacency list, denoted as P.

Then, since the requirement involve classification and division, and thus is suitable to use a disjoint set. Considering that in the process of the algorithm, it is necessary to check other vertices in a same division unit as a specified vertex, then a traditional disjoint set needs to be modified by sacrificing a time complexity of merged division units in exchange for querying all elements in a specified division unit.

In some embodiments, the triplet (u, v, w) is popped from the priority queue Q before merging the visibility sets. The following operations are repeated until the queue is empty.

If u, v are in a same division unit in the disjoint set, the triple is skipped. If the weight of the edge (u, v) in the graph is not equal to w at that time, the triplet has expired and is also skipped. In other cases, due to the nature of the priority queue, an edge with a shortest weight connecting two division units is selected at this time.

Figure 8:
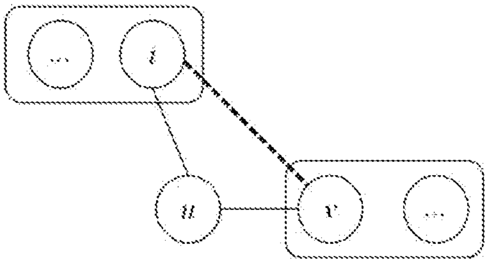
FIG. 8 is a schematic diagram of a bipartite graph including two vertex sets u and v respectively corresponding to visibility sets and a target visibility set according to one or more embodiments of the present disclosure.

For example, please refer to FIG. 8, FIG. 8 is a schematic diagram of an bipartite graph including two vertex sets u and v respectively corresponding to visibility sets and a target visibility set according to one or more embodiments of the present disclosure. For the edge (u, v), through the adjacency list P, vertices that are adjacent to or once adjacent to an edge connected with u with a weight not exceeding L may be efficiently found. The vertices adjacent to the edge connected with u with the weight not exceeding L at this time may be filtered by querying a current weight.

Focus on points satisfying that a sum $M_{i,u}+M_{u,v}$ is small enough and $M_{i,v}$=inf. $M_{i,u}$ represents a maximum difference value between a visibility set in a same division unit as a visibility set i and a visibility set in a same division unit as a visibility set u. $M_{u,v}$ represents a maximum difference value between a visibility set in a same division unit as a visibility set u and a visibility set in a same division unit as a visibility set v. Therefore, it is necessary to determine that v and i are not in the same division unit. A difference value between a visibility set corresponding to point pairs x, y in the same division unit as v and a visibility set corresponding to point pairs x, y in the same division unit as i is determined.

In some embodiments, a maximum value of all difference values is assigned to $M_{i,v}$. If the difference value of $M_{i,v}$ is less than the difference value limit L, (i, v, $M_{i,v}$) also needs to be added to the priority queue, and i, v are added to corresponding rows of the adjacency list P. An optimization method is provided, where first whether $M_{x,y}\neq$inf includes any value exceeding L is observed; if $M_{x,y}\neq$inf includes a value exceeding L, there is no need to calculate; in addition, once a certain difference value exceeds L, the calculation will stop immediately. Identities of u and v are swapped and the operation is repeated.

Then, the two division units where u and v are located are merged.

Figure 9:
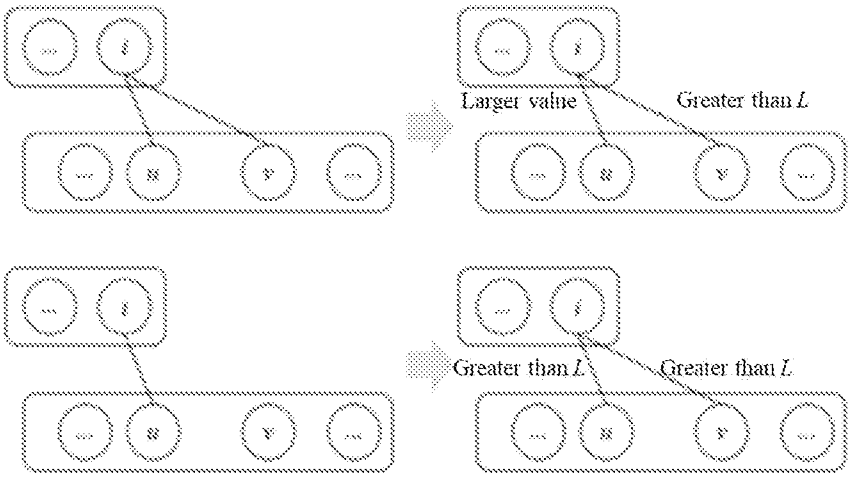
FIG. 9 is a schematic diagram illustrating determining vertices respectively adjacent to vertices u and v based on an adjacency list according to one or more embodiments of the present disclosure.

For example, please refer to FIG. 9, FIG. 9 is a schematic diagram illustrating determining vertices respectively adjacent to vertices u and v through an adjacency list according to one or more embodiments of the present disclosure. The vertices adjacent to u may be obtained through P. For the vertex i, $M_{i,v}$ and $M_{i,u}$ are queried. If a maximum value of $M_{i,v}$ and $M_{i,u}$ is inf, the two values need set to a value greater than L. Otherwise, $M_{i,u}$ is set to the maximum value, and $M_{i,v}$ is set to a value greater than L. Then, the modified (i, u, $M_{i,u}$) is added to the priority queue Q. Finally, the vertices adjacent to v are found, skip vertices that have been processed in this operation, and set weights of edges between remaining vertices and v to a value greater than L.

Finally, integers within an interval [1, m] are traversed. Assuming that i is to be traversed, all elements in the division unit where i is located are queried through the disjoint set. A merged result of visibility sets with these elements as sequence numbers is determined as a new visibility set, and the new visibility set is assigned with numbers. Numbers of old visibility sets is set to correspond to newly assigned numbers, thus corresponding to the new visibility set.

The embodiments of the present disclosure disclose a method for processing game data, including: through a server, obtaining position information of each of sub-regions generated by dividing a virtual game scene in a coordinate system of the virtual game scene, generating a 2D list including all of the sub-regions based on the position information, determining one or more sub-regions adjacent to a specified region according to the 2D list to obtain one or more adjacent sub-regions, determining a visibility set differences between the specified region and each of the adjacent sub-regions, and merging one or more visibility sets of one or more of the adjacent sub-regions corresponding to one or more of the visibility set differences that satisfies a merging condition with a visibility set of the specified region to obtain a merged visibility set. In this way, a cost for computing the visibility sets may be reduced, thereby improving an efficiency of scene rendering based on the visibility sets in the virtual game scene.

To better implement the method for processing game data provided by the embodiments of the present disclosure, one or more embodiments of the present disclosure further provides an apparatus for processing game data based on the above method(s) for processing game data. The meanings of the nouns are the same as those in the above method(s) for processing game data, and for specific implementation details, please refer to the description in the method embodiments.

Figure 10:
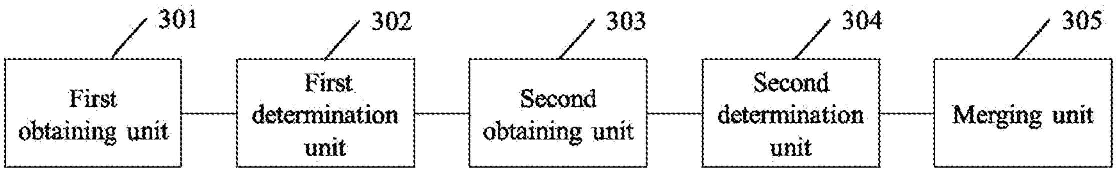
FIG. 10 is a schematic block diagram of a game data processing device according to one or more embodiments of the present disclosure.

Please refer to FIG. 10, FIG. 10 is a schematic block diagram of an apparatus for processing game data provided by an embodiment of the present disclosure, which includes:

a first obtaining unit 301 configured to obtain a target visibility set corresponding to a target sub-region of a plurality of sub-regions, wherein a specified virtual scene is divided into the plurality of sub-regions, the specified virtual scene comprises one or more objects, and the target visibility set comprises visibility of at least one object of the one or more objects in the target sub-region;

a first determination unit 302 configured to determine, from the plurality of sub-regions, one or more of sub-regions adjacent to the target sub-region as one or more adjacent sub-regions;

a second obtaining unit 303 configured to obtain a visibility set corresponding to an adjacent sub-region of the one or more adjacent sub-regions, the visibility set including visibility of at least one object of the one or more objects in the adjacent sub-region;

a second determination unit 304 configured to determine a difference value between the target visibility set and the visibility set; and a merging unit 305 configured to, in response to determining that the difference value satisfies a preset condition, merge the target visibility set and the visibility set to obtain a merged visibility set as a visibility set common to the target sub-region and the adjacent sub-region.

In some embodiments, the second determination unit 304 includes:

a first obtaining subunit configured to, for each object of the one or more objects in the specified virtual scene, obtain first visibility of the target visibility set corresponding to the object and second visibility of the visibility set corresponding to the object;

a comparison subunit configured to obtain a comparison result by comparing each of the first visibility and the second visibility with specified visibility; and a first determination subunit configured to determine the difference value based on the comparison result.

In some embodiments, the first determination subunit is specifically configured to:

for the each object, in response to determining that the comparison result for the object indicates that the first visibility is greater than the specified visibility and the second visibility is less than the specified visibility or indicates that the first visibility is less than the specified visibility and the second visibility is greater than the specified visibility, determine the object as a target object, to obtain one or more target objects; and count a number of the one or more target objects as the difference value.

In some embodiments, the merging unit 305 include:

a second determination subunit configured to in response to determining that the difference value is not greater than the preset difference value, determine the visibility set as a target visibility set for merging; and a first merging subunit configured to merge the target visibility set and the target visibility set for merging to obtain the merged visibility set.

In some embodiments, the first merging subunit is specifically configured to:

for each object of the one or more objects, determine a greater one of first visibility of the target visibility set corresponding to the object and second visibility of the target visibility set corresponding to the object, as an updated visibility corresponding to the object, to obtain updated visibilities respectively corresponding to the one or more objects; and; and construct an updated visibility set based on the updated visibilities to obtain the merged visibility set.

In some embodiments, the first merging subunit is specifically configured to:

sort the plurality of target visibility sets for merging based on magnitudes of difference values between the target visibility set and the plurality of target visibility sets for merging, to obtain a sequence of the plurality of target visibility sets for merging;

merge the target visibility set with the plurality of target visibility sets for merging one by one based on the sequence, to obtain the merged visibility set.

In some embodiments, the device further includes:

a third obtaining unit configured to obtain an other visibility set, wherein a first difference value between the other visibility set and the visibility set satisfies the present condition; and a calculation unit configured to calculate a second difference value between the target visibility set and the other visibility set.

In some embodiments, the merging unit 305 includes:

a second merging unit configured to, in response to determining that the difference value satisfies the preset condition, merge the target visibility set and the visibility set, and in response to determining that the second difference value satisfies the preset condition, merge the target visibility set and the other visibility set, to obtain the merged visibility set.

In some embodiments, the first determination unit 302 includes:

a second obtaining subunit configured to obtain first position information of the target sub-region in the specified virtual scene and second position information of one or more other sub-regions than the target sub-region in the specified virtual scene; and a third determination subunit configured to determine, from the one or more other sub-regions, a sub-region adjacent to the target sub-region based on the first position information and the second position information, as the one or more adjacent sub-regions.

In some embodiments, the third determination subunit is specifically configured to:

determine, based on positional relationship between the first coordinate set and each of the second coordinate sets in the specified coordinate system, a second coordinate set of the second coordinate sets adjacent to the first coordinate set.

In some embodiments, the device further includes:

a fourth obtaining unit configured to obtain historical merging information of the target visibility set;

a performing unit configured to, in response to determining that the historical merging information indicates that the target visibility set has not been merged, merge the target visibility set and the visibility set.

In some embodiments, the device further includes:

a processing unit configured to render the one or more objects in the specified virtual scene based on the merged visibility set.

The embodiments of the present disclosure discloses an apparatus for processing game data, including: a first obtaining unit 301 configured to obtain a target visibility set corresponding to a target sub-region of a plurality of sub-regions, wherein a specified virtual scene is divided into the plurality of sub-regions, the specified virtual scene comprises one or more objects, and the target visibility set comprises visibility of at least one object of the one or more objects in the target sub-region; a first determination unit 302 configured to determine, from the plurality of sub-regions, one or more of sub-regions adjacent to the target sub-region as one or more adjacent sub-regions; a second obtaining unit 303 configured to obtain a visibility set corresponding to an adjacent sub-region of the one or more adjacent sub-regions, the visibility set including visibility of at least one object of the one or more objects in the adjacent sub-region; a second determination unit 304 configured to determine a difference value between the target visibility set and the visibility set; and a merging unit 305 configured to, in response to determining that the difference value satisfies a preset condition, merge the target visibility set and the visibility set to obtain a merged visibility set as a visibility set common to the target sub-region and the adjacent sub-region. This improves an efficiency for processing visibility sets in the virtual scene.

Figure 11:
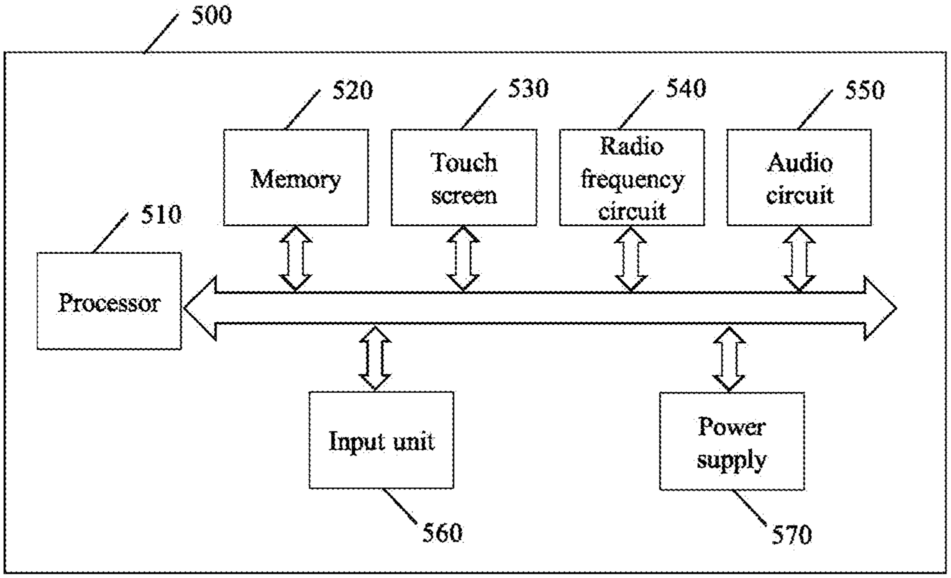
FIG. 11 is a schematic block diagram of a computer device according to one or more embodiments of the present disclosure.
Figure 12:
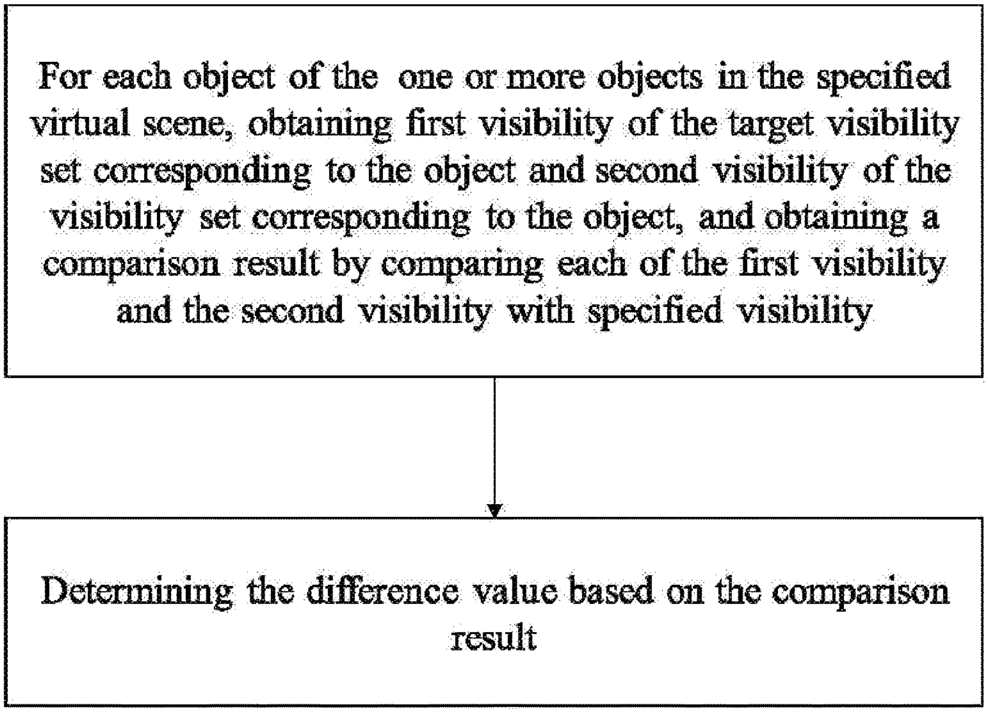
FIG. 12 is a schematic flowchart of a method for determining one or more difference values between a target visibility set and visibility sets according to one or more embodiments of the present disclosure.
Figure 13:
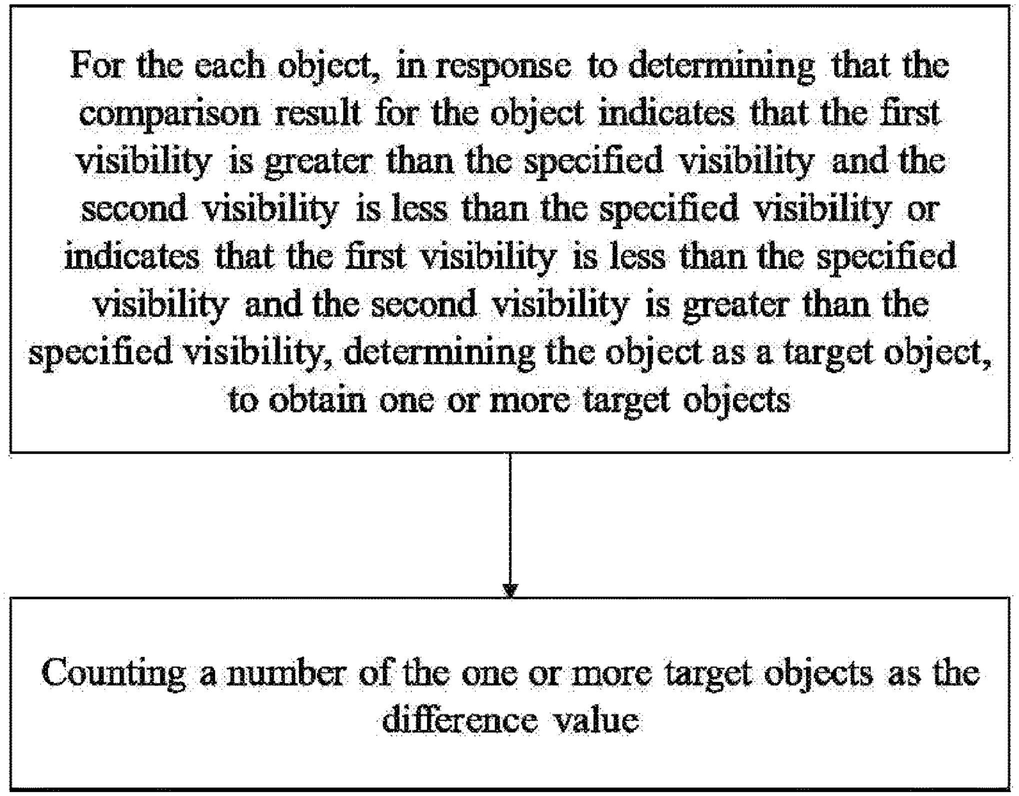
FIG. 13 is a schematic flowchart of a method for determining a difference value based on a comparison result according to one or more embodiments of the present disclosure.
Figure 14:
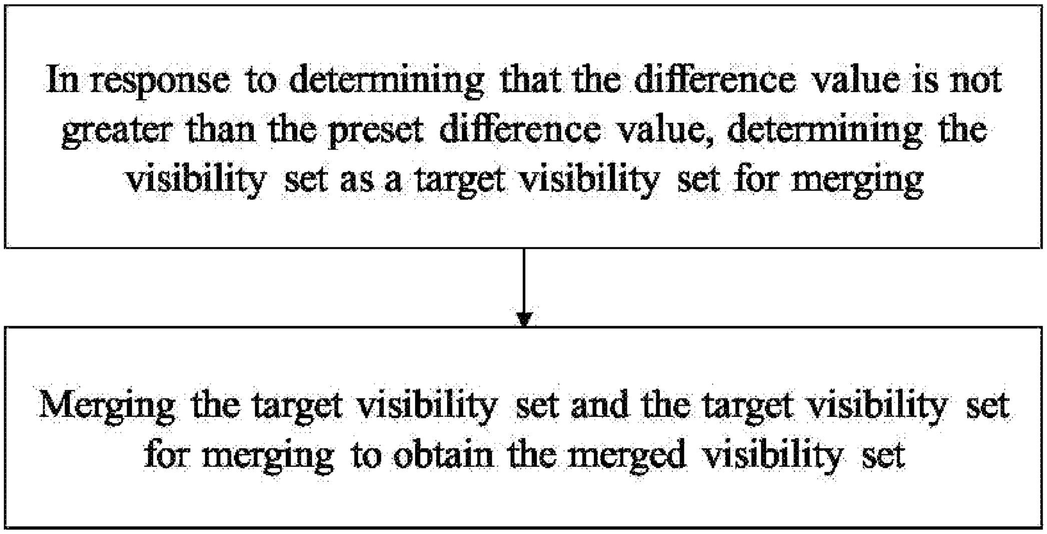
FIG. 14 is a schematic flowchart of a method for merging a target visibility set and each of visibility sets according to one or more embodiments of the present disclosure.
Figure 15:
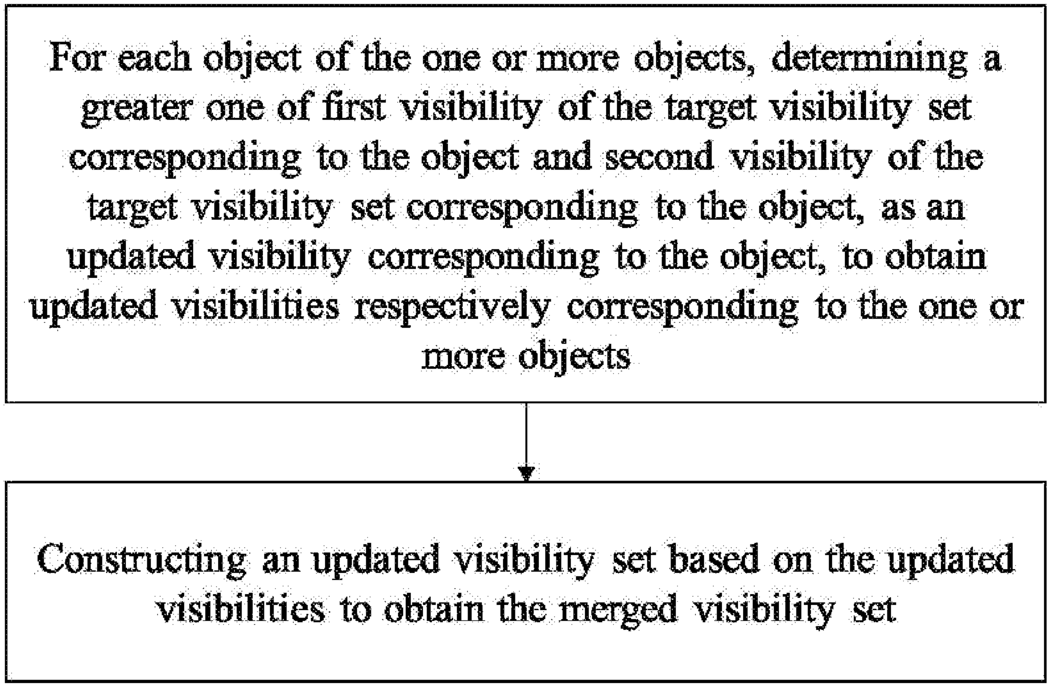
FIG. 15 is a schematic flowchart of a method for merging a target visibility set and each of target visibility sets for merging according to one or more embodiments of the present disclosure.
Figure 16:
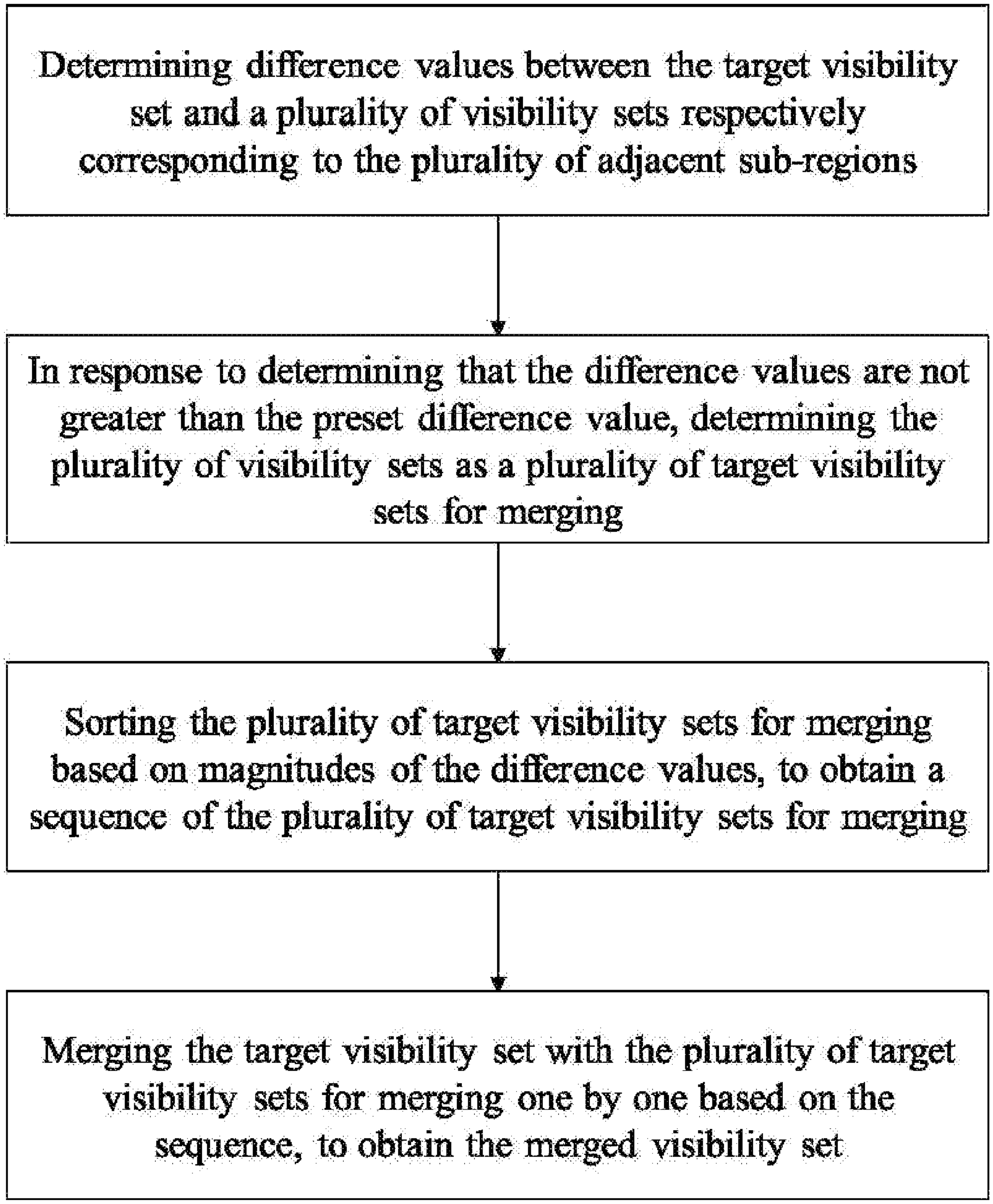
FIG. 16 is a schematic flowchart of a method for merging a target visibility set and each of target visibility sets for merging according to one or more embodiments of the present disclosure.
Figure 17:
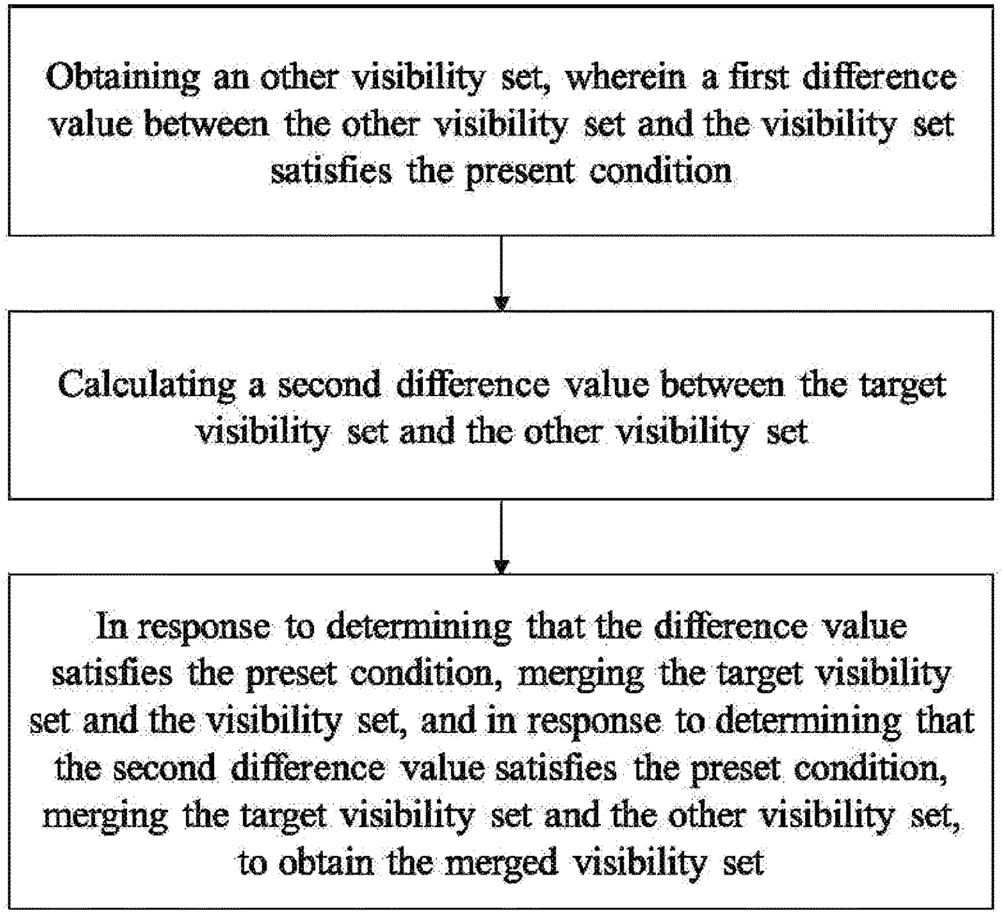
FIG. 17 is a schematic flowchart of a method for obtaining a merged visibility set according to one or more embodiments of the present disclosure.
Figure 18:
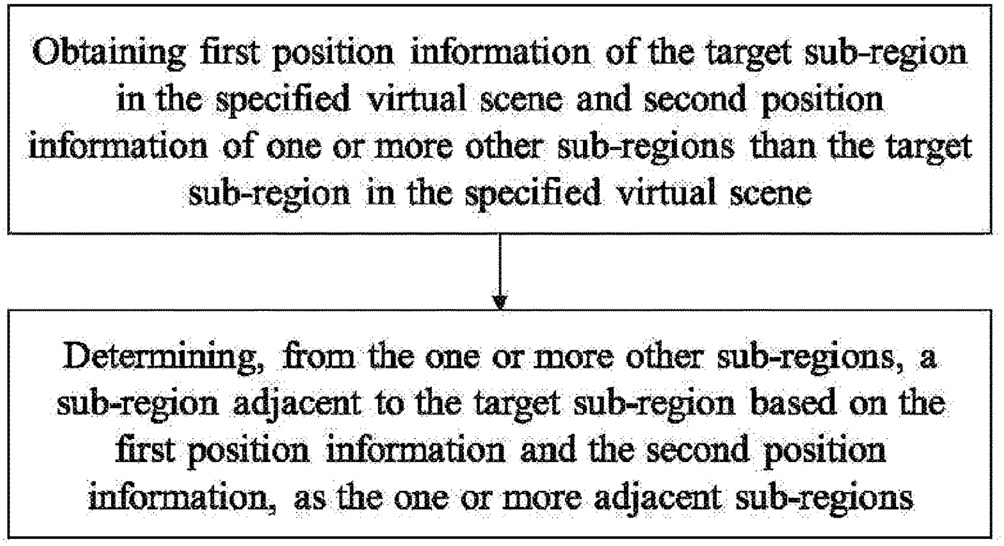
FIG. 18 is a schematic flowchart of a method for determining one or more adjacent sub-regions according to one or more embodiments of the present disclosure.
Figure 19:
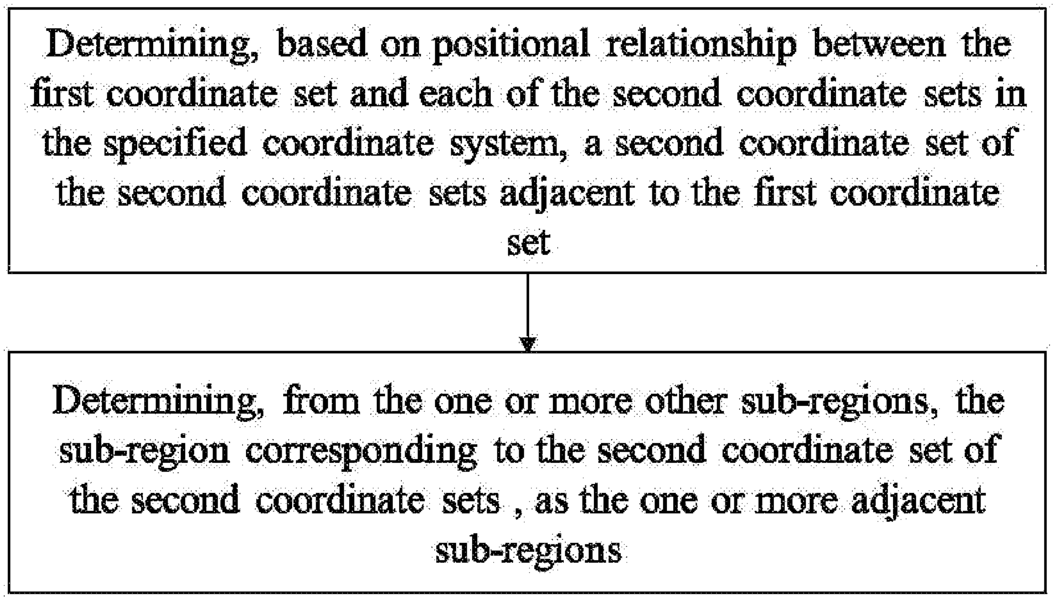
FIG. 19 is a schematic flowchart of a method for determining one or more adjacent sub-regions according to one or more embodiments of the present disclosure.
Figure 20:
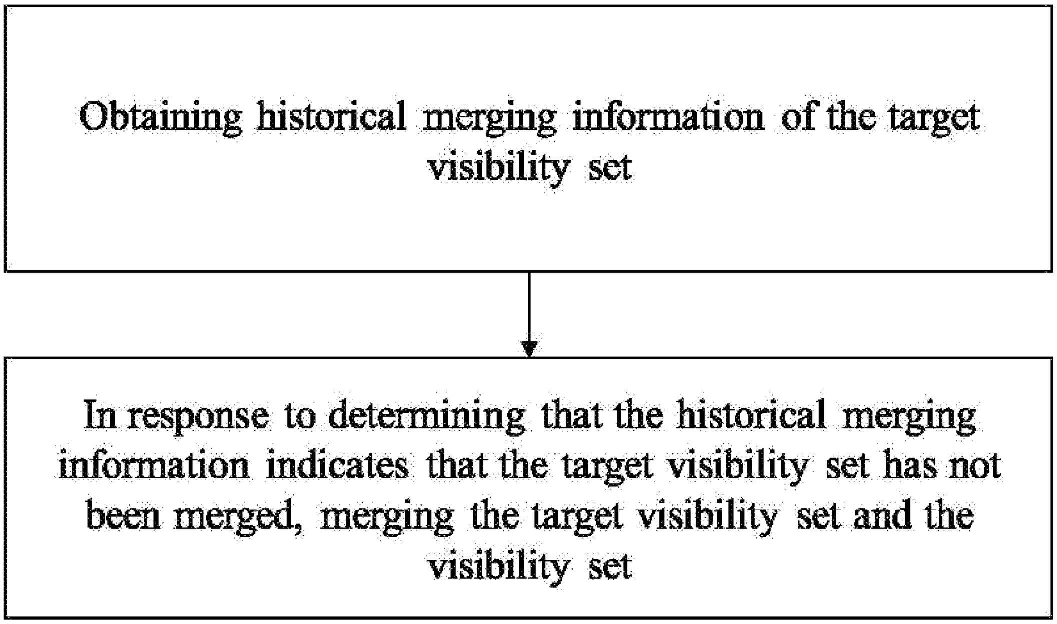
FIG. 20 is a schematic flowchart of a method for merging a target visibility set and each of visibility sets according to one or more embodiments of the present disclosure.

In addition, an embodiment of the present disclosure also provides a computer device, which may be a server. As shown in FIG. 11, FIG. 11 is a schematic block diagram of a computer device according to one or more embodiments of the present disclosure. The computer device 500 includes a processor 501 having one or more processing cores, a memory 502 having one or more computer-readable storage media, and a computer program stored on the memory 502 and operable on the processor. The processor 501 is electrically connected to the memory 502. It will be appreciated by those skilled in the art that the computer device structure shown in drawings does not constitute a limitation on the computer device, and may include more or fewer components than illustrated, or may combine some components, or has different component arrangements.

The processor 501 is a control centre of the computer device 500, connects various parts of the computer device 500 by various interfaces and lines, and performs various functions of the computer device 500 and processes data by running or loading software programs and/or modules stored in the memory 502 and invoking data stored in the memory 502, thereby monitoring the computer device 500 as a whole.

In the embodiments of the present disclosure, the processor 501 in the computer device 500 loads instructions corresponding to processes of one or more application programs into the memory 502 according to the following operations, and runs the application programs stored in the memory 502 to implement various functions:

obtaining a target visibility set corresponding to a target sub-region of a plurality of sub-regions, wherein a specified virtual scene is divided into the plurality of sub-regions, the specified virtual scene comprises one or more objects, and the target visibility set comprises visibility of at least one object of the one or more objects in the target sub-region; determining, from the plurality of sub-regions, one or more of sub-regions adjacent to the target sub-region as one or more adjacent sub-regions; obtaining a visibility set corresponding to an adjacent sub-region of the one or more adjacent sub-regions, the visibility set including visibility of at least one object of the one or more objects in the adjacent sub-region; and determining a difference value between the target visibility set and the visibility set; and in response to determining that the difference value satisfies a preset condition, merging the target visibility set and the visibility set to obtain a merged visibility set as a visibility set common to the target sub-region and the adjacent sub-region.

In some examples, determining the difference value between the target visibility set and the visibility set includes:

for each object of the one or more objects in the specified virtual scene, obtaining first visibility of the target visibility set corresponding to the object and second visibility of the visibility set corresponding to the object;

obtaining a comparison result by comparing each of the first visibility and the second visibility with specified visibility; and determining the difference value based on the comparison result.

In some examples, determining the difference value based on the comparison result includes:

for the each object, in response to determining that the comparison result for the object indicates that the first visibility is greater than the specified visibility and the second visibility is less than the specified visibility or indicates that the first visibility is less than the specified visibility and the second visibility is greater than the specified visibility, determining the object as a target object, to obtain one or more target objects; and counting a number of the one or more target objects as the difference value.

In some examples, the preset condition includes being not greater than a preset difference value;

merging the target visibility set and the visibility set to obtain the merged visibility set in response to determining that the difference value satisfies the preset condition includes:

in response to determining that the difference value is not greater than the preset difference value, determining the visibility set as a target visibility set for merging; and merging the target visibility set and the target visibility set for merging to obtain the merged visibility set.

In some examples, merging the target visibility set and the target visibility set for merging to obtain the merged visibility set includes:

for each object of the one or more objects, determining a greater one of first visibility of the target visibility set corresponding to the object and second visibility of the target visibility set corresponding to the object, as an updated visibility corresponding to the object, to obtain updated visibilities respectively corresponding to the one or more objects; and constructing an updated visibility set based on the updated visibilities to obtain the merged visibility set.

In some examples, the one or more adjacent sub-regions includes a plurality of adjacent sub-regions, and the method further includes:

determining difference values between the target visibility set and a plurality of visibility sets respectively corresponding to the plurality of adjacent sub-regions;

in response to determining that the difference values are not greater than the preset difference value, determining the plurality of visibility sets as a plurality of target visibility sets for merging;

sorting the plurality of target visibility sets for merging based on magnitudes of the difference values, to obtain a sequence of the plurality of target visibility sets for merging; and merging the target visibility set with the plurality of target visibility sets for merging one by one based on the sequence, to obtain the merged visibility set.

In some examples, the method further includes: before merging the target visibility set and the visibility set to obtain the merged visibility set in response to determining that the difference value satisfies the preset condition, obtaining an other visibility set, wherein a first difference value between the other visibility set and the visibility set satisfies the present condition; and calculating a second difference value between the target visibility set and the other visibility set, wherein merging the target visibility set and the visibility set to obtain the merged visibility set in response to determining that the difference value satisfies the preset condition includes:

in response to determining that the difference value satisfies the preset condition, merging the target visibility set and the visibility set, and in response to determining that the second difference value satisfies the preset condition, merging the target visibility set and the other visibility set, to obtain the merged visibility set.

In some examples, determining the one or more sub-regions adjacent to the target sub-region as the one or more adjacent sub-regions includes:

obtaining first position information of the target sub-region in the specified virtual scene and second position information of one or more other sub-regions than the target sub-region in the specified virtual scene; and determining, from the one or more other sub-regions, a sub-region adjacent to the target sub-region based on the first position information and the second position information, as the one or more adjacent sub-regions.

In some examples, the first position information includes a first coordinate set of the target sub-region in a specified coordinate system, the second position information includes respective second coordinate sets of the other sub-regions in the specified coordinate system, and the specified coordinate system is constructed based on the specified virtual scene;

determining, from the one or more other sub-regions, the sub-region adjacent to the target sub-region based on the first position information and the second position information as the one or more adjacent sub-regions includes:

determining, based on positional relationship between the first coordinate set and each of the second coordinate sets in the specified coordinate system, a second coordinate set of the second coordinate sets adjacent to the first coordinate set; and determining, from the one or more other sub-regions, the sub-region corresponding to the second coordinate set of the second coordinate sets, as the one or more adjacent sub-regions.

In some examples, the method further includes: before merging the target visibility set and the visibility set to obtain the merged visibility set in response to determining that the difference value satisfies the preset condition, obtaining historical merging information of the target visibility set;

in response to determining that the historical merging information indicates that the target visibility set has not been merged, merging the target visibility set and the each of the one or more visibility sets.

In some examples, the operations further include: rendering the one or more objects in the specified virtual scene based on the merged visibility set.

In some examples, the plurality of sub-regions are cubic regions of a same shape that do not intersect each other.

Detailed implementation of the above operations may be referred to aforementioned embodiments, and will not be repeated herein.

Through the above implementation solutions, a current target sub-region for visibility processing is determined based on positional relationship(s) between the target sub-region and one or more other sub-regions in a virtual scene, one or more adjacent sub-region adjacent to the target sub-region are selected, and further, an adjacent sub-region is determined from the one or more adjacent sub-region based on difference values between a target visibility set corresponding to the target sub-region and one or more visibility sets corresponding to the one or more adjacent sub-regions, and in response to one or more of the difference values being smaller than a specified difference value, the target visibility set and visibility set(s) of one or more of the adjacent sub-regions corresponding to the one or more of the difference values are merged to obtain a merged visibility set, and the merged visibility set is taken as a visibility set common to the target sub-region and the one or more of the adjacent sub-regions. In this way, a number of times for determining the difference values is reduced, thereby reducing total time for determining the difference values and improving an efficiency for processing visibility sets in the virtual scene.

In some examples, as shown in FIG. 11, the computer device 500 further includes a touch screen 503, a radio frequency circuit 504, an audio circuit 505, an input unit 506, and a power supply 507. The processor 501 is electrically connected to the touch screen 503, the radio frequency circuit 504, the audio circuit 505, the input unit 506, and the power supply 507, respectively. It will be appreciated by those skilled in the art that the computer device structure shown in FIG. 11 does not constitute a limitation on the computer device, and may include more or fewer components than illustrated, or may combine some components, or has different component arrangements.

The touch screen 503 may be configured to display a graphical user interface and to receive operational instructions generated by a user acting on the graphical user interface. The touch display screen 503 may include a display panel and a touch panel. The display panel may be used to display information input by or provided to the user and various graphical user interfaces of the computer device, which may be composed of graphics, introductory messages, icons, videos, and any combination thereof. The display panel may be configured in a form of a Liquid Crystal Display (LCD), an Organic Light-Emitting Diode (OLED), or the like. The touch panel may be used to collect a touch operation (e.g., an operation of the user on or near the touch panel using any suitable object or accessory such as a finger, a stylus, etc.) of the user on or near the touch panel, and generate a corresponding operation instruction, and the operation instruction executes a corresponding program. The touch panel may include a touch detection device and a touch controller. The touch detection device detects a touch orientation of the user, detects a signal brought about by the touch operation, and transmits the signal to the touch controller. The touch controller receives touch information from the touch detection device and converts the touch information into contact coordinates, sends the contact coordinates to the processor 501, and can receive and execute commands sent from the processor 501. The touch panel may cover the display panel, and when the touch panel detects the touch operation on or near the touch panel, the touch panel transmits the touch operation to the processor 501 to determine a type of a touch event. Then, the processor 501 provides a corresponding visual output on the display panel according to the type of the touch event. In the embodiments of the present disclosure, the touch panel and the display panel may be integrated to the touch screen 503 to implement input and output functions. However, in one or more embodiments, the touch panel and the touch panel may be implemented as two separate components to implement the input and output functions. That is, the touch screen 503 may implement the input function as part of the input unit 506.

The radio frequency circuit 504 may be configured to transmit and receive radio frequency signals to establish wireless communication with a network device or other computer devices through wireless communication, and to transmit and receive signals between the network device or other computer devices.

The audio circuit 505 may be used to provide an audio interface between the user and the computer device through a speaker and a microphone. The audio circuit 505 may transmit an electrical signal converted from received audio data to a loudspeaker, and the loudspeaker converts the electrical signal into a sound signal for output. On the other hand, the microphone converts a collected sound signal into an electrical signal, the audio circuit 505 receives and converts the electrical signal into audio data. The audio data is outputted to the processor 501 for processing, and the processed audio data is sent to, for example, another computer device through the radio frequency circuit 504, or the audio data is outputted to the memory 502 for further processing. The audio circuit 505 may also include an earplug jack to provide communication between a peripheral headset and the computer device.

The input unit 506 may be configured to receive input numbers, character information, or user characteristic information (e.g., fingerprints, iris, face information), and to generate keyboard, mouse, joystick, optical, or trackball signal input related to user settings and functional control.

The power supply 507 is configured to power various components of the computer device 500. The power supply 507 may be logically connected to the processor 501 through a power supply management system, so that functions such as charging, discharging, and power consumption management are managed through the power supply management system. The power supply 507 may further include one or more DC or AC power supplies, a recharging system, a power failure detection circuit, a power converter or inverter, a power status indicator, or any other component.

Although not shown in FIG. 11, the computer device 500 may also include a camera, a sensor, a wireless fidelity module, a Bluetooth module, and the like, and details are not described herein.

In the above-mentioned embodiments, the description of each embodiment has its own emphasis, and parts not described in detail in a certain embodiment may be referred to related description of other embodiments.

As can be seen from the above, the computer device provided in the embodiments obtains a target visibility set corresponding to a target sub-region of a plurality of sub-regions, wherein a specified virtual scene is divided into the plurality of sub-regions, the specified virtual scene comprises one or more objects, and the target visibility set comprises visibility of at least one object of the one or more objects in the target sub-region; determines, from the plurality of sub-regions, one or more of sub-regions adjacent to the target sub-region as one or more adjacent sub-regions; obtains a visibility set corresponding to an adjacent sub-region of the one or more adjacent sub-regions, the visibility set including visibility of at least one object of the one or more objects in the adjacent sub-region; and determines a difference value between the target visibility set and the visibility set; and in response to determining that the difference value satisfies a preset condition, merges the target visibility set and the visibility set to obtain a merged visibility set as a visibility set common to the target sub-region and the adjacent sub-region.

It will be appreciated by those of ordinary skill in the art that all or a portion of the operations of the various methods of the above-described embodiments may be performed by instructions, which may be stored in a computer-readable storage medium and loaded and executed by a processor, or may be performed by the instructions through controlling relevant hardware.

To this end, embodiments of the present disclosure provide a computer readable storage medium having stored therein a plurality of computer programs that can be loaded by a processor to perform operations in the methods for processing game data provided in embodiments of the present disclosure. For example, the computer programs may perform the following operations:

obtaining a target visibility set corresponding to a target sub-region of a plurality of sub-regions, wherein a specified virtual scene is divided into the plurality of sub-regions, the specified virtual scene comprises one or more objects, and the target visibility set comprises visibility of at least one object of the one or more objects in the target sub-region;

determining, from the plurality of sub-regions, one or more of sub-regions adjacent to the target sub-region as one or more adjacent sub-regions;

obtaining a visibility set corresponding to an adjacent sub-region of the one or more adjacent sub-regions, the visibility set including visibility of at least one object of the one or more objects in the adjacent sub-region;

determining a difference value between the target visibility set and the visibility set; and in response to determining that the difference value satisfies a preset condition, merging the target visibility set and the visibility set to obtain a merged visibility set as a visibility set common to the target sub-region and the adjacent sub-region.

In some examples, determining the difference value between the target visibility set and the visibility set includes:

for each object of the one or more objects in the specified virtual scene, obtaining first visibility of the target visibility set corresponding to the object and second visibility of the visibility set corresponding to the object;

obtaining a comparison result by comparing each of the first visibility and the second visibility with specified visibility; and determining the difference value based on the comparison result.

In some examples, determining the difference value based on the comparison result includes:

for the each object, in response to determining that the comparison result for the object indicates that the first visibility is greater than the specified visibility and the second visibility is less than the specified visibility or indicates that the first visibility is less than the specified visibility and the second visibility is greater than the specified visibility, determining the object as a target object, to obtain one or more target objects; and counting a number of the one or more target objects as the difference value.

In some examples, the preset condition includes being not greater than a preset difference value;

merging the target visibility set and the visibility set to obtain the merged visibility set in response to determining that the difference value satisfies the preset condition includes:

in response to determining that the difference value is not greater than the preset difference value, determining the visibility set as a target visibility set for merging; and merging the target visibility set and the target visibility set for merging to obtain the merged visibility set.

In some examples, merging the target visibility set and the target visibility set for merging to obtain the merged visibility set includes:

for each object of the one or more objects, determining a greater one of first visibility of the target visibility set corresponding to the object and second visibility of the target visibility set corresponding to the object, as an updated visibility corresponding to the object, to obtain updated visibilities respectively corresponding to the one or more objects; and constructing an updated visibility set based on the updated visibilities to obtain the merged visibility set.

In some examples, the one or more adjacent sub-regions includes a plurality of adjacent sub-regions, and the method further includes:

determining difference values between the target visibility set and a plurality of visibility sets respectively corresponding to the plurality of adjacent sub-regions;

in response to determining that the difference values are not greater than the preset difference value, determining the plurality of visibility sets as a plurality of target visibility sets for merging;

sorting the plurality of target visibility sets for merging based on magnitudes of the difference values, to obtain a sequence of the plurality of target visibility sets for merging;

merging the target visibility set with the plurality of target visibility sets for merging one by one based on the sequence, to obtain the merged visibility set.

In some examples, the method further includes: before merging the target visibility set and the visibility set to obtain the merged visibility set in response to determining that the difference value satisfies the preset condition, obtaining an other visibility set, wherein a first difference value between the other visibility set and the visibility set satisfies the present condition; and calculating a second difference value between the target visibility set and the other visibility set, wherein merging the target visibility set and the visibility set to obtain the merged visibility set in response to determining that the difference value satisfies the preset condition includes:

in response to determining that the difference value satisfies the preset condition, merging the target visibility set and the visibility set, and in response to determining that the second difference value satisfies the preset condition, merging the target visibility set and the other visibility set, to obtain the merged visibility set.

In some examples, determining the one or more sub-regions adjacent to the target sub-region as the one or more adjacent sub-regions includes:

obtaining first position information of the target sub-region in the specified virtual scene and second position information of one or more other sub-regions than the target sub-region in the specified virtual scene; and determining, from the one or more other sub-regions, a sub-region adjacent to the target sub-region based on the first position information and the second position information, as the one or more adjacent sub-regions.

In some examples, the first position information includes a first coordinate set of the target sub-region in a specified coordinate system, the second position information includes respective second coordinate sets of the other sub-regions in the specified coordinate system, and the specified coordinate system is constructed based on the specified virtual scene;

determining, from the one or more other sub-regions, the sub-region adjacent to the target sub-region based on the first position information and the second position information as the one or more adjacent sub-regions includes:

determining, based on positional relationship between the first coordinate set and each of the second coordinate sets in the specified coordinate system, a second coordinate set of the second coordinate sets adjacent to the first coordinate set; and determining, from the one or more other sub-regions, the sub-region corresponding to the second coordinate set of the second coordinate sets, as the one or more adjacent sub-regions.

In some examples, the method further includes: before merging the target visibility set and the visibility set to obtain the merged visibility set in response to determining that the difference value satisfies the preset condition, obtaining historical merging information of the target visibility set;

in response to determining that the historical merging information indicates that the target visibility set has not been merged, merging the target visibility set and the each of the one or more visibility sets.

In some examples, the operations further include: rendering the one or more objects in the specified virtual scene based on the merged visibility set.

In some examples, the plurality of sub-regions are cubic regions of a same shape that do not intersect each other.

Detailed implementation of the above operations may be referred to aforementioned embodiments, and will not be repeated herein.

Through the above implementation solutions, a current target sub-region for visibility processing is determined based on positional relationship(s) between the target sub-region and one or more other sub-regions in a virtual scene, one or more adjacent sub-region adjacent to the target sub-region are selected, and further, an adjacent sub-region is determined from the one or more adjacent sub-region based on difference values between a target visibility set corresponding to the target sub-region and one or more visibility sets corresponding to the one or more adjacent sub-regions, and in response to one or more of the difference values being smaller than a specified difference value, the target visibility set and visibility set(s) of one or more of the adjacent sub-regions corresponding to the one or more of the difference values are merged to obtain a merged visibility set, and the merged visibility set is taken as a visibility set common to the target sub-region and the one or more of the adjacent sub-regions. In this way, a number of times for determining the difference values is reduced, thereby reducing total time for determining the difference values and improving an efficiency for processing visibility sets in the virtual scene.

The storage medium may include a Read Only Memory (ROM), a Random Access Memory (RAM), a magnetic disk, an optical disk, or the like.

Due to the computer programs stored in the storage medium, the operations in any of the game processing methods provided in the embodiments of the present disclosure may be executed. Thus, advantageous effects that can be achieved in any one of the game processing methods provided in the embodiments of the present disclosure can be realized. Details may be referred to the foregoing embodiments, which are not described herein.

Terms used in the present disclosure are merely for describing specific examples and are not intended to limit the present disclosure. The singular forms “one”, “the”, and “this” used in the present disclosure and the appended claims are also intended to include a multiple form, unless other meanings are clearly represented in the context. It should also be understood that the term “and/or” used in the present disclosure refers to any or all of possible combinations including one or more associated listed items.

Reference throughout this specification to “one embodiment,” “an embodiment,” “an example,” “some embodiments,” “some examples,” or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms “first”, “second”, “third”, and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term “if” used herein may be explained as “when” or “while”, or “in response to . . . , it is determined that”.

The terms “module,” “sub-module,” “circuit,” “sub-circuit,” “circuitry,” “sub-circuitry,” “unit,” or “sub-unit” may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Some embodiments of the present disclosure have been described in detail above. The description of the above embodiments merely aims to help to understand the present disclosure. Many modifications or equivalent substitutions with respect to the embodiments may occur to those of ordinary skill in the art based on the present disclosure. Thus, these modifications or equivalent substitutions shall fall within the scope of the present disclosure.

What is claimed is:

1. A method for processing game data, comprising:

obtaining a target visibility set corresponding to a target sub-region of a plurality of sub-regions, wherein a specified virtual scene is divided into the plurality of sub-regions, the specified virtual scene comprises one or more objects, and the target visibility set comprises visibility of at least one object of the one or more objects in the target sub-region, wherein the specified virtual scene is a model of a real scene constructed by a software program according to a certain proportion and displayed by a display device, and each of the one or more objects has corresponding visibility in each of the plurality of sub-regions;

determining, from the plurality of sub-regions, one or more of sub-regions adjacent to the target sub-region as one or more adjacent sub-regions;

obtaining a visibility set corresponding to an adjacent sub-region of the one or more adjacent sub-regions, the visibility set comprising visibility of at least one object of the one or more objects in the adjacent sub-region; and determining a difference value between the target visibility set and the visibility set, and in response to determining that the difference value satisfies a preset condition, merging the target visibility set and the visibility set to obtain a merged visibility set as a visibility set common to the target sub-region and the adjacent sub-region;

wherein the one or more adjacent sub-regions comprises a plurality of adjacent sub-regions, and the method further comprises:

determining difference values between the target visibility set and a plurality of visibility sets respectively corresponding to the plurality of adjacent sub-regions;

in response to determining that the difference values are not greater than the preset difference value, determining the plurality of visibility sets as a plurality of target visibility sets for merging;

sorting the plurality of target visibility sets for merging based on magnitudes of the difference values, to obtain a sequence of the plurality of target visibility sets for merging; and merging the target visibility set with the plurality of target visibility sets for merging one by one based on the sequence, to obtain the merged visibility set.

2. The method of claim 1, wherein determining the difference value between the target visibility set and the visibility set comprises:

for each object of the one or more objects in the specified virtual scene, obtaining first visibility of the target visibility set corresponding to the object and second visibility of the visibility set corresponding to the object, and obtaining a comparison result by comparing each of the first visibility and the second visibility with specified visibility; and determining the difference value based on the comparison result.

3. The method of claim 2, wherein determining the difference value based on the comparison result comprises:

for the each object, in response to determining that the comparison result for the object indicates that the first visibility is greater than the specified visibility and the second visibility is less than the specified visibility or indicates that the first visibility is less than the specified visibility and the second visibility is greater than the specified visibility, determining the object as a target object, to obtain one or more target objects; and counting a number of the one or more target objects as the difference value.

4. The method of claim 1, wherein the preset condition comprises being not greater than a preset difference value; and merging the target visibility set and the visibility set to obtain the merged visibility set in response to determining that the difference value satisfies the preset condition comprises:

in response to determining that the difference value is not greater than the preset difference value, determining the visibility set as a target visibility set for merging; and merging the target visibility set and the target visibility set for merging to obtain the merged visibility set.

5. The method of claim 4, wherein merging the target visibility set and the target visibility set for merging to obtain the merged visibility set comprises:

for each object of the one or more objects, determining a greater one of first visibility of the target visibility set corresponding to the object and second visibility of the target visibility set corresponding to the object, as an updated visibility corresponding to the object, to obtain updated visibilities respectively corresponding to the one or more objects; and constructing an updated visibility set based on the updated visibilities to obtain the merged visibility set.

6. The method of claim 1, further comprising:

obtaining another visibility set, wherein a first difference value between another visibility set and the visibility set satisfies the preset condition; and calculating a second difference value between the target visibility set and another visibility set, wherein merging the target visibility set and the visibility set to obtain the merged visibility set in response to determining that the difference value satisfies the preset condition comprises:

in response to determining that the difference value satisfies the preset condition, merging the target visibility set and the visibility set, and in response to determining that the second difference value satisfies the preset condition, merging the target visibility set and another visibility set, to obtain the merged visibility set.

7. The method of claim 1, wherein determining the one or more sub-regions adjacent to the target sub-region as the one or more adjacent sub-regions comprises:

obtaining first position information of the target sub-region in the specified virtual scene and second position information of one or more other sub-regions than the target sub-region in the specified virtual scene; and determining, from the one or more other sub-regions, a sub-region adjacent to the target sub-region based on the first position information and the second position information, as the one or more adjacent sub-regions.

8. The method of claim 7, wherein the first position information comprises a first coordinate set of the target sub-region in a specified coordinate system, the second position information comprises respective second coordinate sets of the one or more other sub-regions in the specified coordinate system, and the specified coordinate system is constructed based on the specified virtual scene; and determining, from the one or more other sub-regions, the sub-region adjacent to the target sub-region based on the first position information and the second position information as the one or more adjacent sub-regions comprises:

determining, based on positional relationship between the first coordinate set and each of the second coordinate sets in the specified coordinate system, a second coordinate set of the second coordinate sets adjacent to the first coordinate set; and determining, from the one or more other sub-regions, the sub-region corresponding to the second coordinate set of the second coordinate sets, as the one or more adjacent sub-regions.

9. The method of claim 8, wherein determining the second coordinate set of the second coordinate sets adjacent to the first coordinate set based on the positional relationship between the first coordinate set and the each of the second coordinate sets in the specified coordinate system comprises:

in response to that the positional relationship indicates that one of the second coordinate sets comprises a coordinate point within the first coordinate set, determining the one of the second coordinate sets as the second coordinate set of the second coordinate sets adjacent to the first coordinate set.

10. The method of claim 1, further comprising:

obtaining historical merging information of the target visibility set, wherein merging the target visibility set and the visibility set comprises:

in response to determining that the historical merging information indicates that the target visibility set has not been merged, merging the target visibility set and the visibility set.

11. The method of claim 1, further comprising:

rendering the one or more objects in the specified virtual scene based on the merged visibility set.

12. The method of claim 1, wherein the plurality of sub-regions are cubic regions of a same shape that do not intersect each other.

13. A computer device, comprising a processor and a memory storing a computer program executable by the processor to perform operations comprising:

obtaining a target visibility set corresponding to a target sub-region of a plurality of sub-regions, wherein a specified virtual scene is divided into the plurality of sub-regions, the specified virtual scene comprises one or more objects, and the target visibility set comprises visibility of at least one object of the one or more objects in the target sub-region, wherein the specified virtual scene is a model of a real scene constructed by a software program according to a certain proportion and displayed by a display device, and each of the one or more objects has corresponding visibility in each of the plurality of sub-regions;

determining, from the plurality of sub-regions, one or more of sub-regions adjacent to the target sub-region as one or more adjacent sub-regions;

obtaining a visibility set corresponding to an adjacent sub-region of the one or more adjacent sub-regions, the visibility set comprising visibility of at least one object of the one or more objects in the adjacent sub-region; and determining a difference value between the target visibility set and the visibility set, and in response to determining that the difference value satisfies a preset condition, merging the target visibility set and the visibility set to obtain a merged visibility set as a visibility set common to the target sub-region and the adjacent sub-region;

wherein the one or more adjacent sub-regions comprises a plurality of adjacent sub-regions, and the operations further comprise:

determining difference values between the target visibility set and a plurality of visibility sets respectively corresponding to the plurality of adjacent sub-regions;

in response to determining that the difference values are not greater than the preset difference value, determining the plurality of visibility sets as a plurality of target visibility sets for merging;

sorting the plurality of target visibility sets for merging based on magnitudes of the difference values, to obtain a sequence of the plurality of target visibility sets for merging; and merging the target visibility set with the plurality of target visibility sets for merging one by one based on the sequence, to obtain the merged visibility set.

14. A non-transitory storage medium storing a plurality of instructions executable by a processor to perform operations comprising:

obtaining a target visibility set corresponding to a target sub-region of a plurality of sub-regions, wherein a specified virtual scene is divided into the plurality of sub-regions, the specified virtual scene comprises one or more objects, and the target visibility set comprises visibility of at least one object of the one or more objects in the target sub-region, wherein the specified virtual scene is a model of a real scene constructed by a software program according to a certain proportion and displayed by a display device, and each of the one or more objects has corresponding visibility in each of the plurality of sub-regions;

determining, from the plurality of sub-regions, one or more of sub-regions adjacent to the target sub-region as one or more adjacent sub-regions;

obtaining a visibility set corresponding to an adjacent sub-region of the one or more adjacent sub-regions, the visibility set comprising visibility of at least one object of the one or more objects in the adjacent sub-region; and determining a difference value between the target visibility set and the visibility set, and in response to determining that the difference value satisfies a preset condition, merging the target visibility set and the visibility set to obtain a merged visibility set as a visibility set common to the target sub-region and the adjacent sub-region;

wherein the one or more adjacent sub-regions comprises a plurality of adjacent sub-regions, and the operations further comprise:

determining difference values between the target visibility set and a plurality of visibility sets respectively corresponding to the plurality of adjacent sub-regions;

in response to determining that the difference values are not greater than the preset difference value, determining the plurality of visibility sets as a plurality of target visibility sets for merging;

sorting the plurality of target visibility sets for merging based on magnitudes of the difference values, to obtain a sequence of the plurality of target visibility sets for merging; and merging the target visibility set with the plurality of target visibility sets for merging one by one based on the sequence, to obtain the merged visibility set.

15. The storage medium of claim 14, wherein determining the difference value between the target visibility set and the visibility set comprises:

for each object of the one or more objects in the specified virtual scene, obtaining first visibility of the target visibility set corresponding to the object and second visibility of the visibility set corresponding to the object, and obtaining a comparison result by comparing each of the first visibility and the second visibility with specified visibility; and determining the difference value based on the comparison result.

16. The storage medium of claim 15, wherein determining the difference value based on the comparison result comprises:

for the each object, in response to determining that the comparison result for the object indicates that the first visibility is greater than the specified visibility and the second visibility is less than the specified visibility or indicates that the first visibility is less than the specified visibility and the second visibility is greater than the specified visibility, determining the object as a target object, to obtain one or more target objects; and counting a number of the one or more target objects as the difference value.

17. The storage medium of claim 14, wherein the preset condition comprises being not greater than a preset difference value; and merging the target visibility set and the visibility set to obtain the merged visibility set in response to determining that the difference value satisfies the preset condition comprises:

in response to determining that the difference value is not greater than the preset difference value, determining the visibility set as a target visibility set for merging; and merging the target visibility set and the target visibility set for merging to obtain the merged visibility set.

18. The storage medium of claim 17, wherein merging the target visibility set and the target visibility set for merging to obtain the merged visibility set comprises:

for each object of the one or more objects, determining a greater one of first visibility of the target visibility set corresponding to the object and second visibility of the target visibility set corresponding to the object, as an updated visibility corresponding to the object, to obtain updated visibilities respectively corresponding to the one or more objects; and constructing an updated visibility set based on the updated visibilities to obtain the merged visibility set.

* * * * *